(12) United States Patent
Sazegar

(10) Patent No.: US 10,903,572 B2
(45) Date of Patent: Jan. 26, 2021

(54) DUAL RESONATOR FOR FLAT PANEL ANTENNAS

(71) Applicant: KYMETA CORPORATION, Redmond, WA (US)

(72) Inventor: Mohsen Sazegar, Kirkland, WA (US)

(73) Assignee: KYMETA CORPORATION, Redmond, WA (US)

( * ) Notice: Subject to any disclaimer, the term of this patent is extended or adjusted under 35 U.S.C. 154(b) by 0 days.

(21) Appl. No.: 15/792,015

(22) Filed: Oct. 24, 2017

(65) Prior Publication Data

US 2018/0115068 A1 Apr. 26, 2018

Related U.S. Application Data

(60) Provisional application No. 62/412,094, filed on Oct. 24, 2016.

(51) Int. Cl.
*H01Q 5/48* (2015.01)
*H01Q 9/04* (2006.01)
*H01Q 9/28* (2006.01)
*H01Q 21/06* (2006.01)
*H01Q 21/00* (2006.01)
*H04B 7/185* (2006.01)

(52) U.S. Cl.
CPC .............. *H01Q 5/48* (2015.01); *H01Q 9/04* (2013.01); *H01Q 9/0428* (2013.01); *H01Q 9/0442* (2013.01); *H01Q 9/28* (2013.01); *H01Q 9/285* (2013.01); *H01Q 21/0031* (2013.01); *H01Q 21/062* (2013.01); *H01Q 21/065* (2013.01); *H04B 7/18513* (2013.01)

(58) Field of Classification Search
CPC .... H01Q 5/48; H01Q 21/0031; H01Q 21/062; H01Q 9/0428; H01Q 9/285; H01Q 9/0442; H01Q 21/065; H01Q 9/04; H01Q 9/28
USPC ........................................................ 343/795
See application file for complete search history.

(56) References Cited

U.S. PATENT DOCUMENTS

| 8,537,051 | B1* | 9/2013 | Rudish | ..................... H01Q 3/22 342/375 |
| 9,391,375 | B1* | 7/2016 | Bales | ..................... H01Q 21/24 |
| 2002/0140616 | A1* | 10/2002 | Kanamaluru | ........ H01Q 21/064 343/756 |
| 2014/0266946 | A1* | 9/2014 | Bily | ..................... H01Q 13/22 343/771 |

(Continued)

*Primary Examiner* — Hai V Tran
(74) *Attorney, Agent, or Firm* — Womble Bond Dickinson (US) LLP

(57) ABSTRACT

Dual resonator for flat panel antennas is disclosed. In one example, an antenna comprises a single physical antenna aperture having at least two spatially interleaved antenna sub-arrays of antenna elements operable as two resonator sets with a frequency offset with respect to each other. The antenna sub-arrays are operated together to form a beam in the desired frequency band. Each sub-array has a modulation pattern calculated based on holographic beam steering algorithms. The frequency offset between the sub-arrays can be achieved, e.g., by geometrical differences of the radiative antenna elements or differences in electromagnetic loading of the radiative antenna elements. By using two or dual resonator sets with frequency offset, significant improvement to dynamic bandwidth can be achieved in contrast to a single resonator antenna by expanding the dynamic bandwidth range with dual resonators.

20 Claims, 20 Drawing Sheets

(56) References Cited

U.S. PATENT DOCUMENTS

| | | | |
|---|---|---|---|
| 2015/0222014 A1* | 8/2015 | Stevenson | H01Q 13/18 |
| | | | 342/372 |
| 2015/0236412 A1* | 8/2015 | Bily | H01Q 21/0031 |
| | | | 342/374 |
| 2016/0233588 A1* | 8/2016 | Bily | H01Q 21/28 |
| 2017/0170557 A1* | 6/2017 | Shipton | C09K 19/3003 |
| 2017/0256865 A1* | 9/2017 | Sikes | H01Q 9/0407 |

* cited by examiner

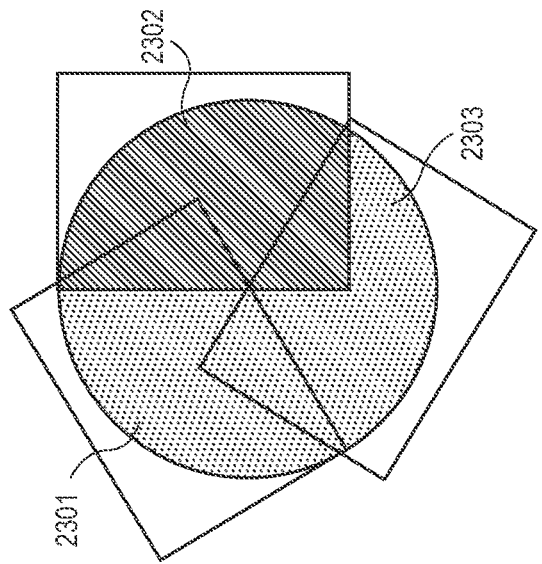
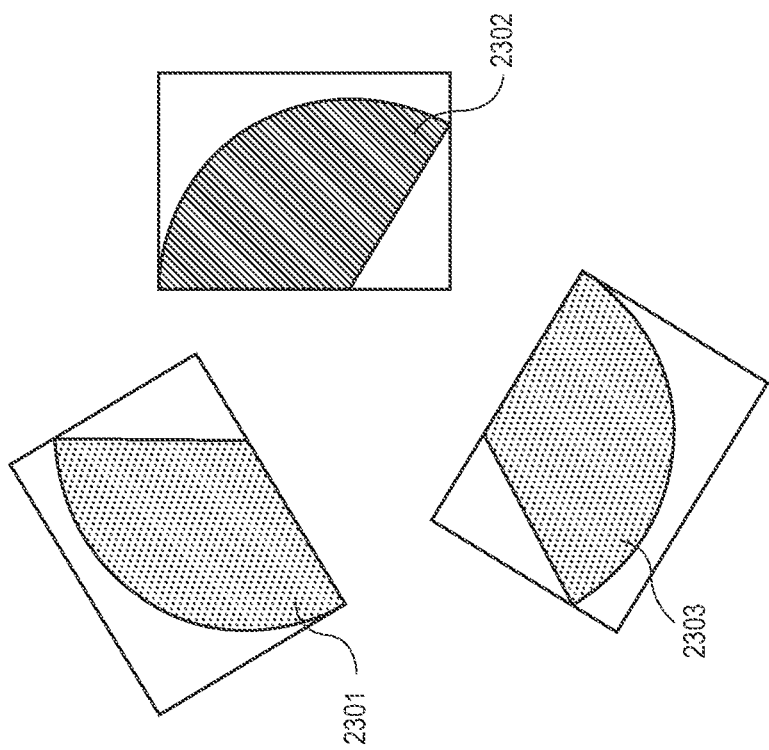

US 10,903,572 B2

DUAL RESONATOR FOR FLAT PANEL ANTENNAS

PRIORITY

This application claims priority and the benefit of U.S. Provisional Patent Application No. 62/412,094, entitled "DUAL RESONATOR," filed on Oct. 24, 2016, which is hereby incorporated by reference and commonly assigned.

FIELD

Examples of the invention are in the field of communications including satellite communications and antennas. More particularly, examples of the invention relate to a dual resonator for flat panel antennas.

BACKGROUND

Satellite communications involve transmission of microwaves. Microwaves can have small wavelengths and be transmitted at high frequencies in the gigahertz (GHz) range. Satellite antennas can produce focused beams of high-frequency microwaves that allow for point-to-point communications having broad bandwidth and high transmission rates. One type of satellite antenna is a flat panel antenna. This type of antenna includes a number of panels or segments having dipoles to receive and transmit microwave signals. The antenna should operate and utilize a full frequency bandwidth to receive and transmit microwave signals.

SUMMARY

Dual resonator for flat panel antennas is disclosed. In one example, an antenna comprises a single physical antenna aperture having at least two spatially interleaved antenna sub-arrays of antenna elements operable as two resonator sets with a frequency offset with respect to each other. The antenna sub-arrays are operated together to form a beam in the desired frequency band. Each sub-array has a modulation pattern calculated based on holographic beam steering algorithms. The frequency offset between the sub-arrays can be achieved, e.g., by geometrical differences of the radiative antenna elements or differences in electromagnetic loading of the radiative antenna elements.

Other apparatuses, methods, and systems using a dual resonator for flat panel antennas are described.

BRIEF DESCRIPTION OF THE DRAWINGS

The present invention will be understood more fully from the detailed description given below and from the accompanying drawings of various examples and examples which, however, should not be taken to the limit the invention to the specific examples and examples, but are for explanation and understanding only.

FIGS. 23A and 23B illustrate one example of an antenna aperture with an odd number of segments.

DETAILED DESCRIPTION

Dual resonator for flat panel antennas is disclosed. In one example, an antenna comprises a single physical antenna aperture having at least two spatially interleaved antenna sub-arrays of antenna elements operable as two resonator sets with a frequency offset with respect to each other. The antenna sub-arrays are operated together to form a beam in the desired frequency band. Each sub-array has a modulation pattern calculated based on holographic beam steering algorithms. The frequency offset between the sub-arrays can be achieved, e.g., by geometrical differences of the radiative antenna elements or differences in electromagnetic loading of the radiative antenna elements. By using two or dual resonator sets with frequency offset, significant improvement to dynamic bandwidth can be achieved in contrast to a single resonator antenna by expanding the dynamic bandwidth range with dual resonators.

In the following description, numerous details are set forth to provide a more thorough explanation of the present invention. It will be apparent, however, that the present invention may be practiced without these specific details. In other instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Dual Resonator for Flat Panel Antennas

Figures 1A, 1B:
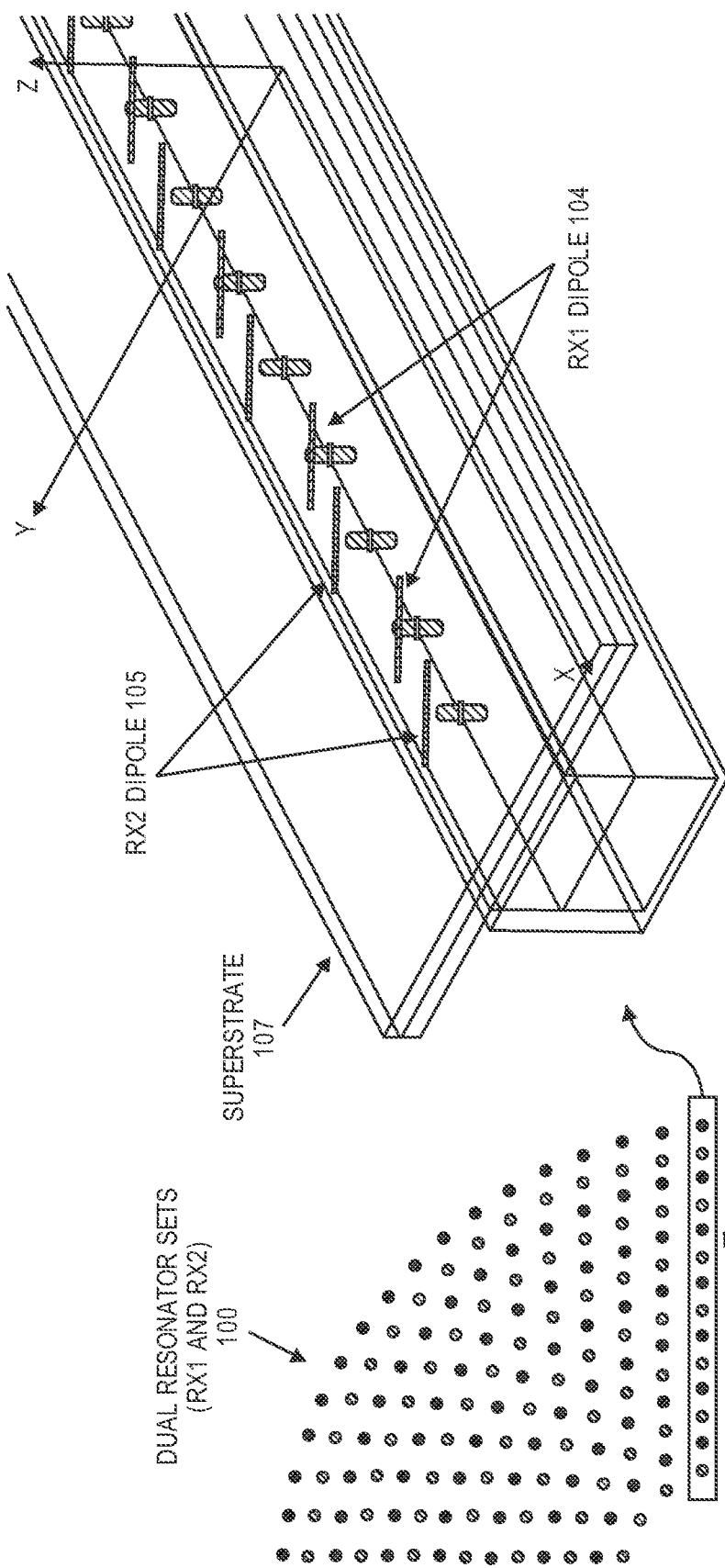
FIG. 1A illustrates one example of a top view a flat panel aperture with dual resonator sets.
FIG. 1B illustrates one example of a three dimensional view of a superstrate with a dipole for a first resonator set and a dipole for a second resonator set.

FIG. 1A illustrates one example of a top view of a flat panel aperture with dual resonator sets (RX1 and RX2) 100 which can provide expanded dynamic bandwidth for a holographic beam steering. In one example, for dual resonator sets 100, first resonator set RX1 can represent the first ring of resonators (radiating cells or radiative elements) and every other ring thereafter, and second resonator sets RX2 can represent the second ring of resonators or radiating cells or radiative elements and every other ring thereafter along the aperture of the antenna as shown in linear section 102 that extends radially along the aperture of the antenna in an interleaving manner. The radiating cells can be divided into two resonator sets in any number of configurations such as alternating RX1 and RX2 within the same ring or be randomly distributed. In one example, the radiating cells of the dual resonator sets 100 are interleaved to provide an average uniform distribution.

FIG. 1B illustrates one example of a three dimensional view of a superstrate 107 with a dipole for a first resonator set (RX1 dipole 104) and a dipole for a second resonator set (RX2 dipole 105). In one example, a single resonator or radiating cell includes an iris and patch with a liquid crystal in between as described in FIGS. 5A-23B. In one example, iris and patch dimensions can be identical for RX1 dipole 104 and RX2 dipole 105 for the first and second resonator sets RX1 and RX2. In one example, by changing a dielectric constant of the liquid crystal, the resonance frequency for resonators can move to lower frequencies. For an antenna, dynamic bandwidth is limited by the frequency shift from the tuned and un-tuned states (voltage on and voltage off) of liquid crystals. By using the dual resonator sets as described herein, the dynamic bandwidth of the antenna is increased without increasing liquid crystal tunability. The dual resonator sets RX1 and RX2 can operate in a band which can be divided into sub-bands to improve dynamic bandwidth.

Figure 2:
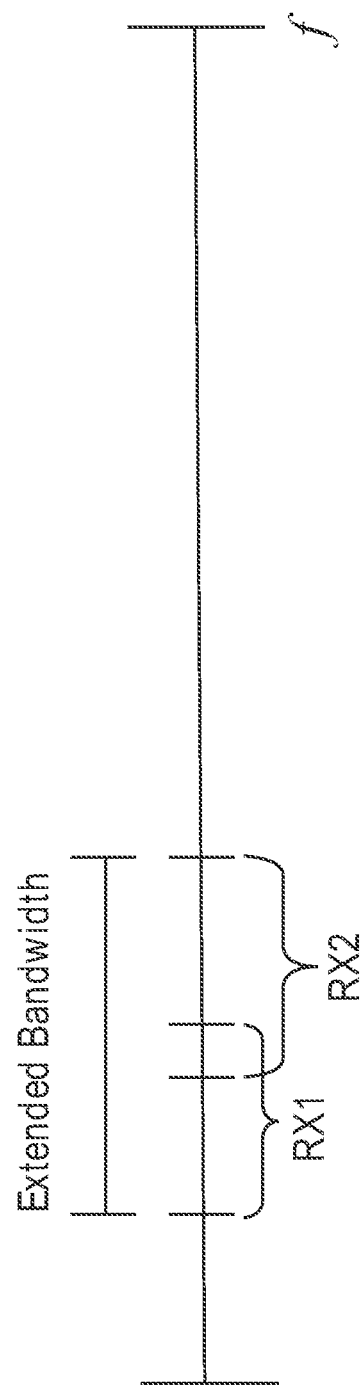
FIG. 2 illustrates an expanded frequency band using the dual resonator sets of FIGS. 1A-1B.

In one example, RX1 dipole 104 can be placed on a bottom layer of superstrate 107, RX2 dipole 105 can be placed on a top layer of the superstrate 107. In one example, dual resonances can be achieved by using RX1 dipole 104 and RX2 dipole which can be of different lengths and stacked for the resonator cell at different layers in superstrate 107. In one example, one dipole can be smaller than the other dipole for RX1 and RX2. In one example, the first set and second set of resonators RX1 and RX2 (100) are configured to operate independently with a frequency offset with respect to each other due to different size and placement of dipoles (RX1 dipole 104 and RX2 dipole 105) associated with the resonator sets RX1 and RX2. By using dual resonators (RX1 and RX2) with frequency offset, significant improvement to dynamic bandwidth can be achieved in contrast to a single resonator antenna by expanding the bandwidth range as shown in FIG. 2. In one example, the antennas disclosed herein can be configured to provide a modulation pattern generated using the dual resonator sets RX1 and RX2 for each single band.

Referring to FIG. 2, in the frequency band f, for example, the first resonator sets can have a frequency band RX1 and the second resonator sets can have frequency band RX2 which can overlap and have an offset. Because the first and second resonator sets have different frequency offsets, the frequency bandwidth range for the dual resonator sets can be extended and maximize the full range of the dynamic bandwidth for satellite communications in contrast to a single resonator system for an antenna. That is, for example, the frequency offset between the dual resonator sets RX1 and RX2 allows for an increase of the overall dynamic bandwidth of the antenna.

In one example, the offset of frequency bandwidth between RX1 and RX2 can be adjusted to desired ranges by changes in dimensions of RX1 dipole 104 and RX2 dipole 105 or other parameter modifications. In one example, separate patterns can be generated for the two different sets of resonators RX1 and RX2 or the two sets function together to generate the beam (e.g., Rx beam). Each sets of resonators RX1 and RX2 can have a modulation pattern calculated based on holographic beam steering algorithms. In one example, the two sets of resonators RX1 and RX2 have a frequency offset with respect to each other when they are both in off states or both in on states. This offset can increase the overall frequency range that can be covered by the antenna. In one example, if the bandwidth that is to be covered is 1 GHz, then the overlap is 20%, or 200 Hz. Even though there is a frequency offset, both of the sets of cells or resonators RX1 and RX2 can operate together to form a beam.

In one example, two sets of resonator cells or radiative elements differ from each other to create the frequency offset. There are a number of ways to make them different. For example, the radiatives of the two different sets can be electromagnetically loaded differently. The radiative elements or cells in one set can be loaded more or less than radiative elements or cells of the other set. This may be done by using dipoles. In another example, the geometry of the radiative elements or cells can be different to achieve the frequency offset. In yet another example, a combination of differences in cell geometry and electromagnetic loading (e.g., use of dipoles) is used to achieve the frequency offset.

Figure 3A:
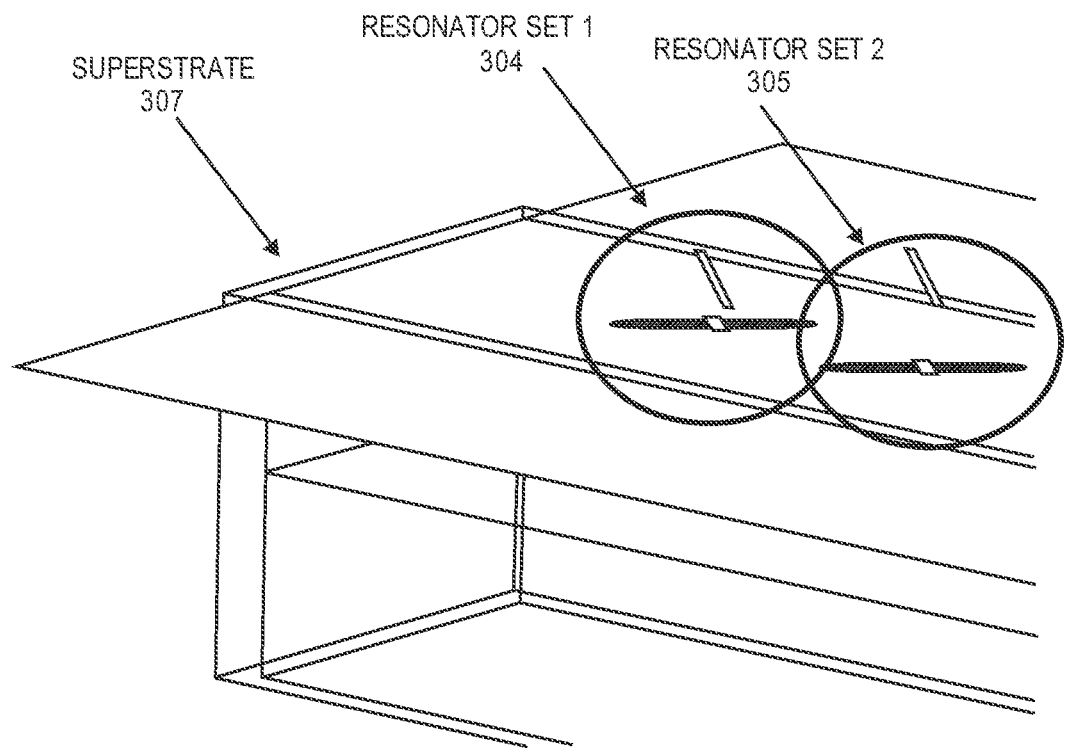
FIGS. 3A-3B illustrates dual resonator sets on a superstrate and corresponding frequency graphs.
Figure 3B:
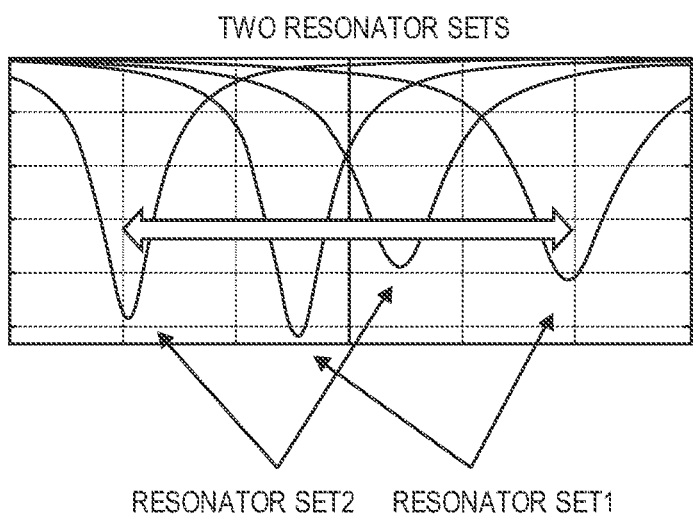
Figure 4A:
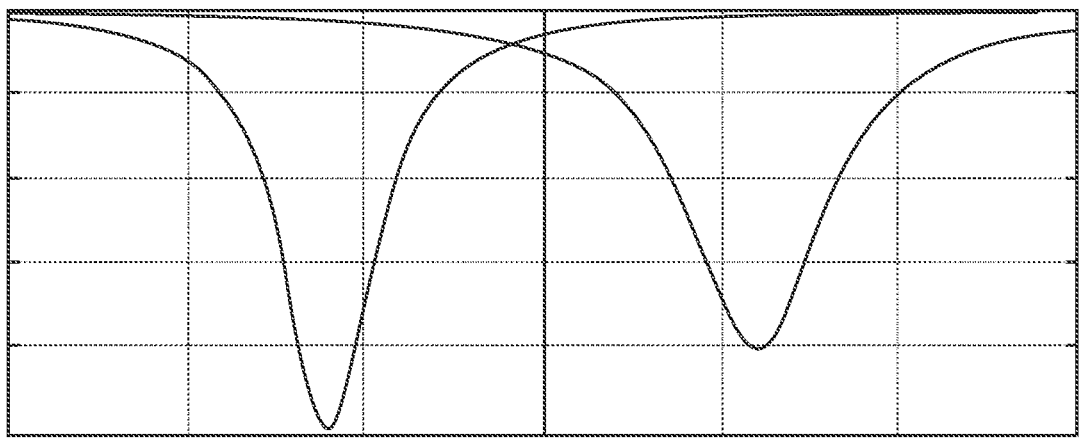
FIGS. 4A-4B illustrates corresponding frequency graphs for a single resonator set and dual resonator sets.
Figure 4B:
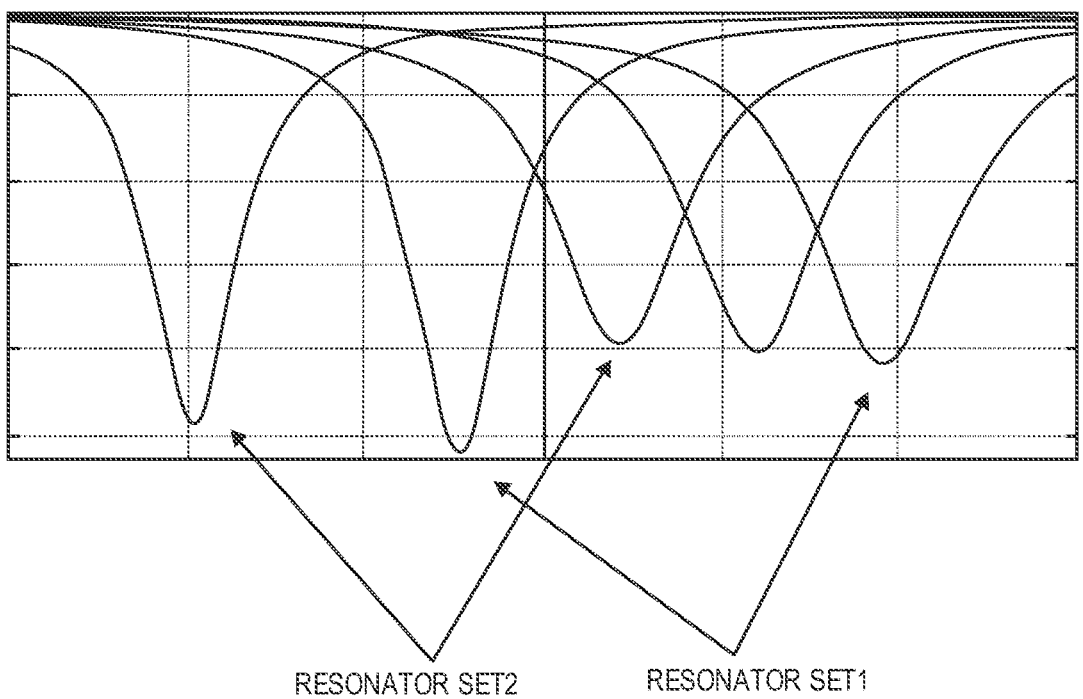

FIGS. 3A-3B illustrates dual resonator set 1 (304) and set 2 (305) corresponding exemplary frequency graphs. FIGS. 4A-4B illustrates corresponding exemplary frequency graphs for a single resonator set and dual resonator sets. These graphs illustrate that dynamic bandwidth is a key performance parameter of an antenna which can be improved using dual resonators. In these examples and embodiments, the antenna sub-arrays are operated together to form a beam in the desired frequency band. Each sub-array has a modulation pattern calculated based on holographic beam steering algorithms. The frequency offset between the sub-arrays can be achieved, e.g., by geometrical differences of the radiative antenna elements or differences in electromagnetic loading of the radiative antenna elements.

Exemplary Flat Panel Antennas

The above dual resonator examples and embodiments as described in FIGS. 1A-4B can be implemented in for flat panel antennas as described in FIGS. 5A-23B. In one example, the flat panel antenna is part of a metamaterial antenna system. Examples of a metamaterial antenna system for communications satellite earth stations are described. In one example, the antenna system is a component or subsystem of a satellite earth station (ES) operating on a mobile platform (e.g., aeronautical, maritime, land, etc.) that operates using frequencies for civil commercial satellite communications. In some examples, the antenna system also can be used in earth stations that are not on mobile platforms (e.g., fixed or transportable earth stations).

In one example, the antenna system uses surface scattering metamaterial technology to form and steer transmit and receive beams through separate antennas. In one example, the antenna systems are analog systems, in contrast to antenna systems that employ digital signal processing to electrically form and steer beams (such as phased array antennas).

In one example, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Example Wave Guide Structures for Flat Panel Antennas

Figure 5A:
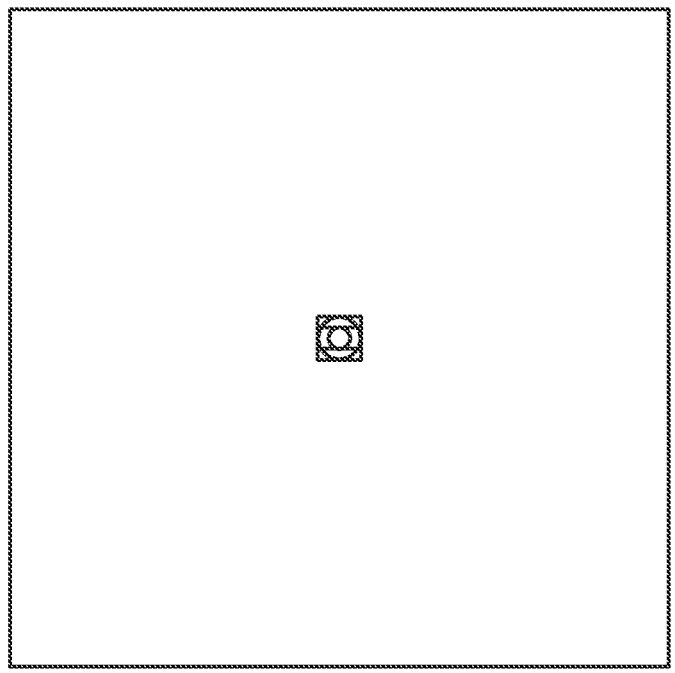
FIG. 5A illustrates a top view of one example of a coaxial feed that is used to provide a cylindrical wave feed.
Figure 5B:
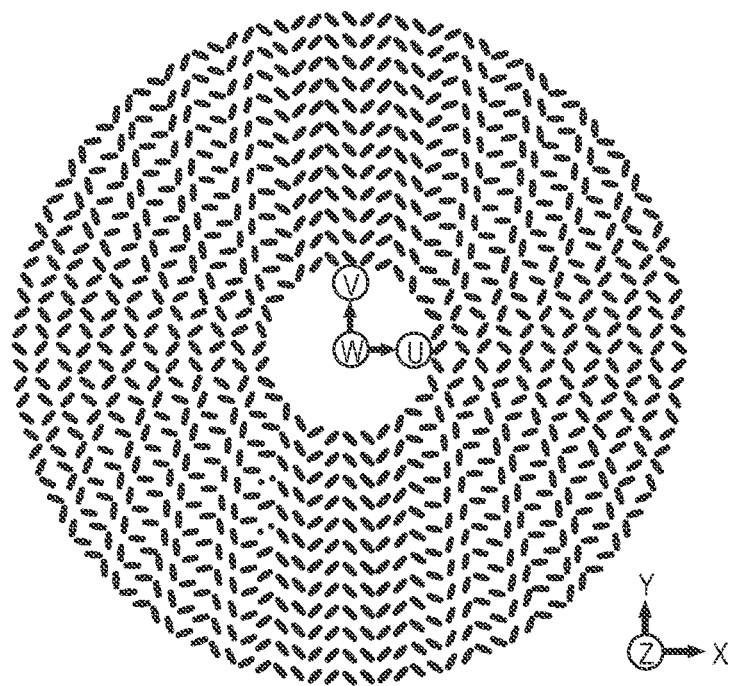
FIG. 5B illustrates an aperture having one or more arrays of antenna elements placed in concentric rings around an input feed of the cylindrically fed antenna according to one example.

FIG. 5A illustrates a top view of one example of a coaxial feed that is used to provide a cylindrical wave feed. Referring to FIG. 5A, the coaxial feed includes a center conductor and an outer conductor. In one example, the cylindrical wave feed architecture feeds the antenna from a central point with an excitation that spreads outward in a cylindrical manner from the feed point. That is, a cylindrically fed antenna creates an outward travelling concentric feed wave. In one example, the shape of the cylindrical feed antenna around the cylindrical feed can be circular, square or any shape. In another example, a cylindrically fed antenna creates an inward travelling feed wave. In such a case, the feed wave most naturally comes from a circular structure. FIG. 5B illustrates an aperture having one or more arrays of antenna elements placed in concentric rings around an input feed of the cylindrically fed antenna.

Antenna Elements

In one example, the antenna elements comprise a group of patch and slot antennas (unit cells). This group of unit cells comprises an array of scattering metamaterial elements. In one example, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. LC in the context of CELC refers to inductance-capacitance, as opposed to liquid crystal.

In one example, a liquid crystal (LC) is disposed in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one example, the liquid crystal integrates an on/off switch and intermediate states between on and off for the transmission of energy from the guided wave to the CELC. When switched on, the CELC emits an electromagnetic wave like an electrically small dipole antenna. The teachings and techniques described herein are not limited to having a liquid crystal that operates in a binary fashion with respect to energy transmission.

In one example, the feed geometry of this antenna system allows the antenna elements to be positioned at forty-five degree (45°) angles to the vector of the wave in the wave feed. Note that other positions may be used (e.g., at 40° angles). This position of the elements enables control of the free space wave received by or transmitted/radiated from the elements. In one example, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one example, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides as described above.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one example, a matrix drive is used to apply voltage to the patches in order to drive each cell separately from all the other cells without having a separate connection for each cell (direct drive). Because of the high density of elements, the matrix drive is the most efficient way to address each cell individually.

In one example, the control structure for the antenna system has 2 main components: the controller, which includes drive electronics for the antenna system, is below the wave scattering structure, while the matrix drive switching array is interspersed throughout the radiating RF array in such a way as to not interfere with the radiation. In one example, the drive electronics for the antenna system comprise commercial off-the-shelf LCD controls used in commercial television appliances that adjust the bias voltage for each scattering element by adjusting the amplitude of an AC bias signal to that element.

In one example, the controller also contains a microprocessor executing software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the controller controls which elements are turned off and which elements are turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one example, multistate control is used in which various elements are turned on and off to varying levels, further approximating a sinusoidal control pattern, as opposed to a square wave (i.e., a sinusoid gray shade modulation pattern). In one example, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one example, the antenna system produces one steerable beam for the uplink antenna and one steerable beam for the downlink antenna. In one example, the antenna system uses metamaterial technology to receive beams and to decode signals from the satellite and to form transmit beams that are directed toward the satellite. In one example, the antenna systems are analog systems, in contrast to antenna systems that employ digital signal processing to electrically form and steer beams (such as phased array antennas). In one example, the antenna system is considered a "surface" antenna that is planar and relatively low profile, especially when compared to conventional satellite dish receivers.

Figure 6:
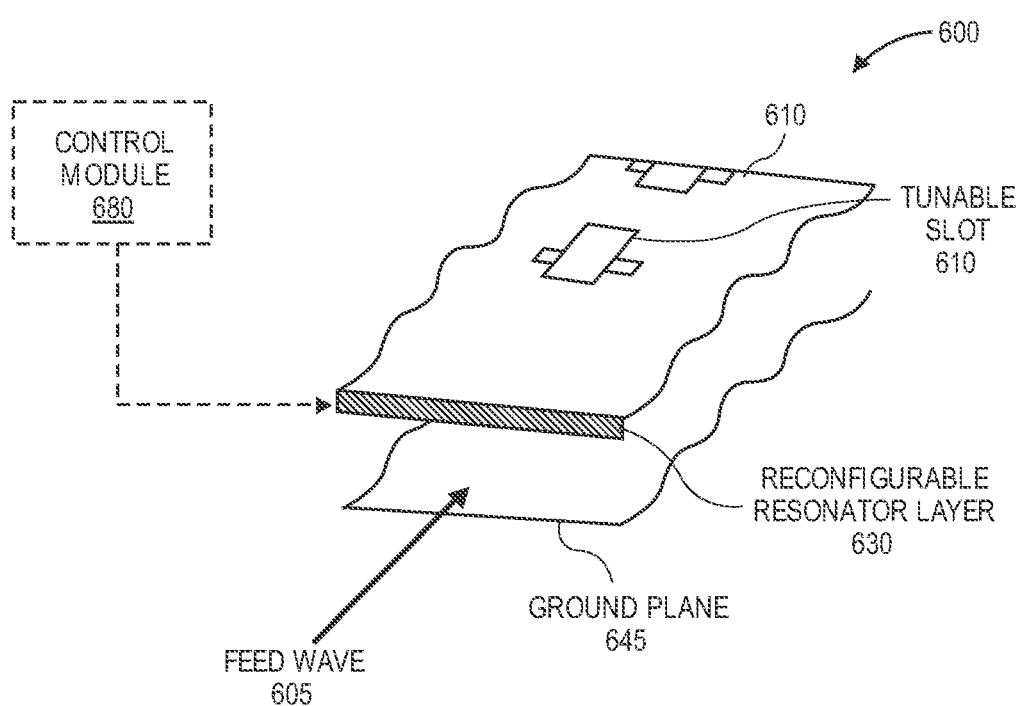
FIG. 6 illustrates a perspective view of one row of antenna elements that includes a ground plane and a reconfigurable resonator layer according to one example.

FIG. 6 illustrates a perspective view 600 of one row of antenna elements that includes a ground plane 645 and a reconfigurable resonator layer 630. Reconfigurable resonator layer 630 includes an array of tunable slots 610. The array of tunable slots 610 can be configured to point the antenna in a desired direction. Each of the tunable slots can be tuned/adjusted by varying a voltage across the liquid crystal.

Control module 680 is coupled to reconfigurable resonator layer 630 to modulate the array of tunable slots 610 by varying the voltage across the liquid crystal in FIG. 6. Control module 680 may include a Field Programmable Gate Array ("FPGA"), a microprocessor, a controller, System-on-a-Chip (Sock), or other processing logic. In one example, control module 680 includes logic circuitry (e.g., multiplexer) to drive the array of tunable slots 610. In one example, control module 680 receives data that includes specifications for a holographic diffraction pattern to be driven onto the array of tunable slots 610. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 680 may drive each array of tunable slots described in the figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 605 (approximately 20 GHz in some examples). To transform a feed wave into a radiated beam (either for transmitting or receiving purposes), an interference pattern is calculated between the desired RF beam (the object beam) and the feed wave (the reference beam). The interference pattern is driven onto the array of tunable slots 610 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram}=w^{*}_{in}w_{out}$, with $w_{in}$ as the wave equation in the waveguide and $w_{out}$ the wave equation on the outgoing wave.

Figure 7:
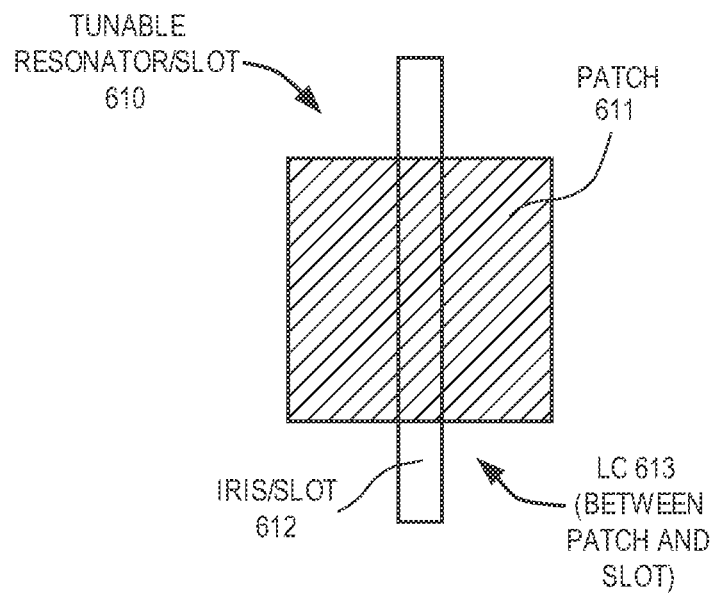
FIG. 7 illustrates one example of a tunable resonator/slot.

FIG. 7 illustrates one example of a tunable resonator/slot 610. Tunable slot 610 includes an iris/slot 612, a radiating patch 611, and liquid crystal (LC) 613 disposed between iris 612 and patch 611. In one example, radiating patch 611 is co-located with iris 612.

Figure 8:
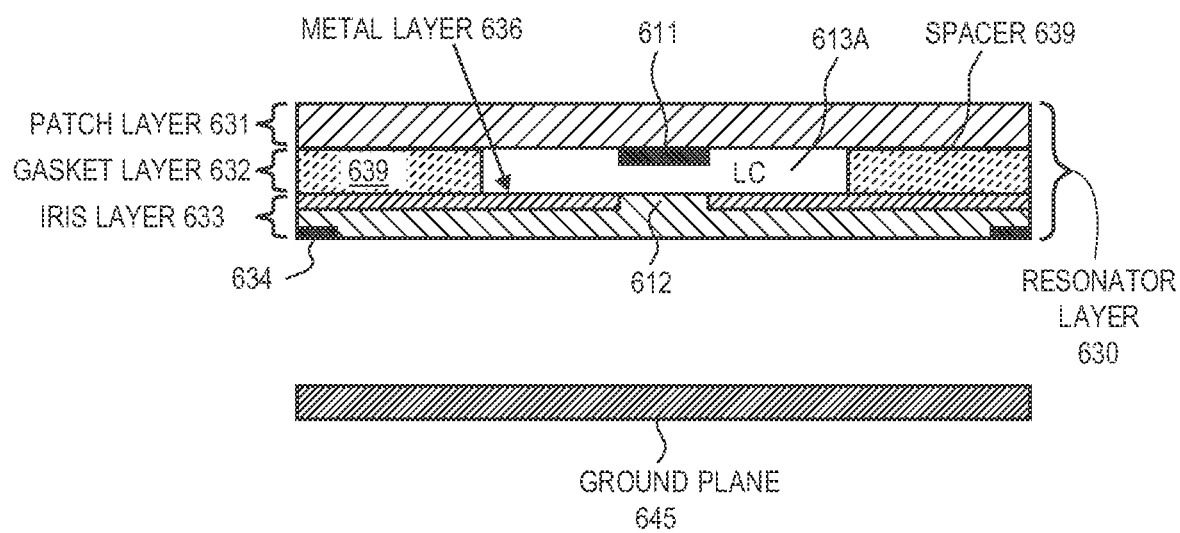
FIG. 8 illustrates a cross section view of one example of a physical antenna aperture.

FIG. 8 illustrates a cross section view of a physical antenna aperture according to one example. The antenna aperture includes ground plane 645, and a metal layer 636 within iris layer 633, which is included in reconfigurable resonator layer 630. In one example, the antenna aperture of FIG. 8 includes a plurality of tunable resonator/slots 610 of FIG. 7. Iris/slot 612 is defined by openings in metal layer 636. A feed wave, such as feed wave 605 of FIG. 6, may have a microwave frequency compatible with satellite communication channels. The feed wave propagates between ground plane 645 and resonator layer 630.

Reconfigurable resonator layer 630 also includes gasket layer 632 and patch layer 631. Gasket layer 632 is disposed between patch layer 631 and iris layer 633. In one example, a spacer could replace gasket layer 632. In one example, Iris layer 633 is a printed circuit board ("PCB") that includes a copper layer as metal layer 636. In one example, iris layer 633 is glass. Iris layer 633 may be other types of substrates.

Openings may be etched in the copper layer to form slots 612. In one example, iris layer 633 is conductively coupled by a conductive bonding layer to another structure (e.g., a waveguide) in FIG. 8. Note that in an example the iris layer is not conductively coupled by a conductive bonding layer and is instead interfaced with a non-conducting bonding layer.

Patch layer 631 may also be a PCB that includes metal as radiating patches 611. In one example, gasket layer 632 includes spacers 639 that provide a mechanical standoff to define the dimension between metal layer 636 and patch 611. In one example, the spacers are 75 microns, but other sizes may be used (e.g., 3-200 mm). As mentioned above, in one example, the antenna aperture of FIG. 8 includes multiple tunable resonator/slots, such as tunable resonator/slot 610 includes patch 611, liquid crystal 613, and iris 612 of FIG. 7. The chamber for liquid crystal 613 is defined by spacers 639, iris layer 633 and metal layer 636. When the chamber is filled with liquid crystal, patch layer 631 can be laminated onto spacers 639 to seal liquid crystal within resonator layer 630.

A voltage between patch layer 631 and iris layer 633 can be modulated to tune the liquid crystal in the gap between the patch and the slots (e.g., tunable resonator/slot 610). Adjusting the voltage across liquid crystal 613 varies the capacitance of a slot (e.g., tunable resonator/slot 610). Accordingly, the reactance of a slot (e.g., tunable resonator/slot 610) can be varied by changing the capacitance. Resonant frequency of slot 610 also changes according to the equation $$f = \frac{1}{2\pi\sqrt{LC}}$$

where f is me resonant frequency of slot 610 and L and C are the inductance and capacitance of slot 610, respectively. The resonant frequency of slot 610 affects the energy radiated from feed wave 605 propagating through the waveguide. As an example, if feed wave 605 is 20 GHz, the resonant frequency of a slot 610 may be adjusted (by varying the capacitance) to 17 GHz so that the slot 610 couples substantially no energy from feed wave 605. Or, the resonant frequency of a slot 610 may be adjusted to 20 GHz so that the slot 610 couples energy from feed wave 605 and radiates that energy into free space. Although the examples given are binary (fully radiating or not radiating at all), full grey scale control of the reactance, and therefore the resonant frequency of slot 610 is possible with voltage variance over a multi-valued range. Hence, the energy radiated from each slot 610 can be finely controlled so that detailed holographic diffraction patterns can be formed by the array of tunable slots.

In one example, tunable slots in a row are spaced from each other by $\lambda/5$. Other types of spacing may be used. In one example, each tunable slot in a row is spaced from the closest tunable slot in an adjacent row by $\lambda/2$, and, thus, commonly oriented tunable slots in different rows are spaced by $\lambda/4$, though other spacing are possible (e.g., $\lambda/5$, $\lambda/6.3$). In another example, each tunable slot in a row is spaced from the closest tunable slot in an adjacent row by $\lambda/3$.

Examples of the invention use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015, to the multi-aperture needs of the marketplace.

Figures 9A, 9B:
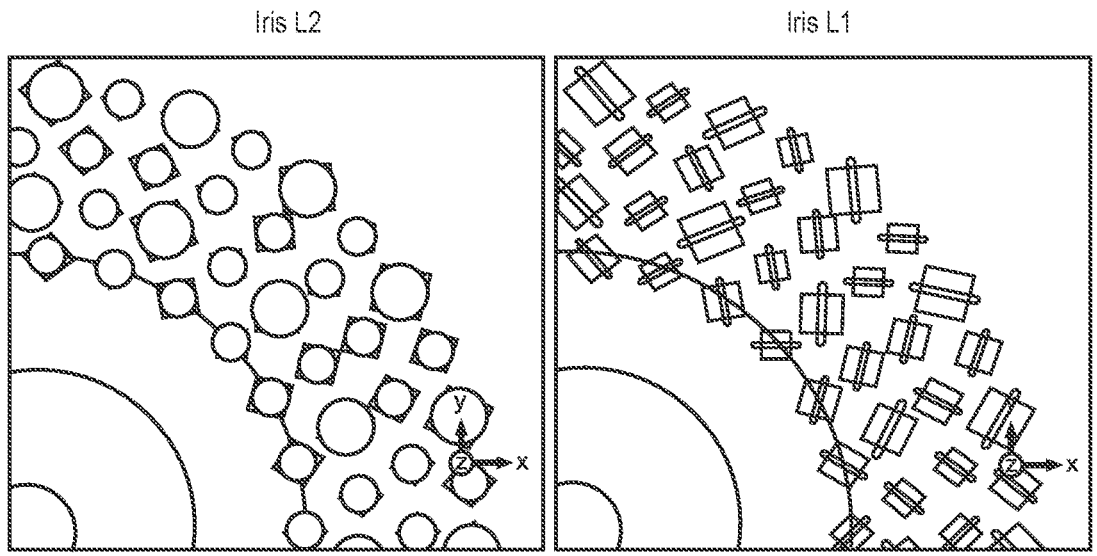
FIGS. 9A-9D illustrate one example of the different layers for creating the slotted array.
Figures 9C, 9D:
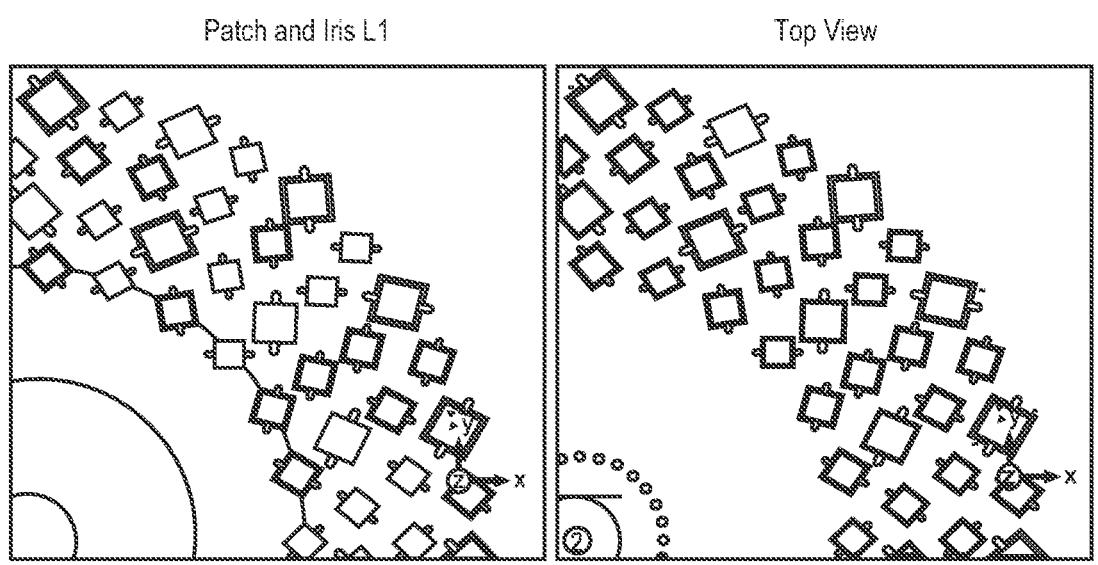

FIG. 9A-9D illustrate one example of the different layers for creating the slotted array. Note that in this example the antenna array has two different types of antenna elements that are used for two different types of frequency bands. FIG. 9A illustrates a portion of the first iris board layer with locations corresponding to the slots according to one example. Referring to FIG. 9A, the circles are open areas/slots in the metallization in the bottom side of the iris substrate, and are for controlling the coupling of elements to the feed (the feed wave). In this example, this layer is an optional layer and is not used in all designs. FIG. 9B illustrates a portion of the second iris board layer containing slots according to one example. FIG. 9C illustrates patches over a portion of the second iris board layer according to one example. FIG. 9D illustrates a top view of a portion of the slotted array according to one example.

Figure 10A:
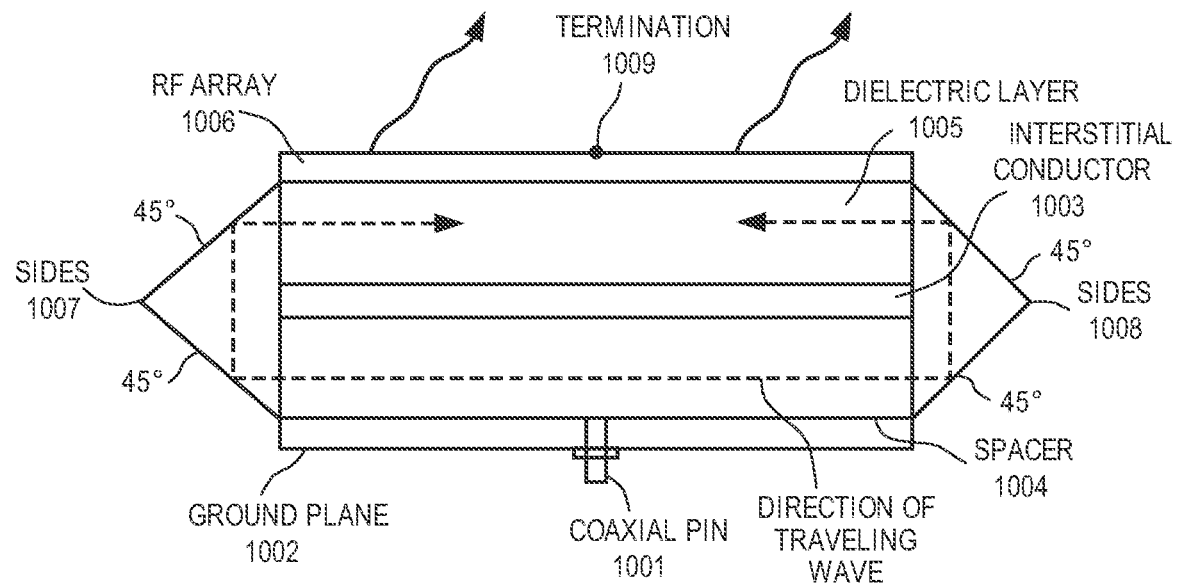
FIG. 10A illustrates a side view of one example of a cylindrically fed antenna structure.

FIG. 10A illustrates a side view of one example of a cylindrically fed antenna structure. The antenna produces an inwardly travelling wave using a double layer feed structure (i.e., two layers of a feed structure). In one example, the antenna includes a circular outer shape, though this is not required. That is, non-circular inward travelling structures can be used. In one example, the antenna structure in FIG. 10A includes the coaxial feed of FIGS. 5A-5B.

Referring to FIG. 10A, a coaxial pin 1001 is used to excite the field on the lower level of the antenna. In one example, coaxial pin 1001 is a 50Ω coax pin that is readily available. Coaxial pin 1001 is coupled (e.g., bolted) to the bottom of the antenna structure, which is conducting ground plane 1002.

Separate from conducting ground plane 1002 is interstitial conductor 1003, which is an internal conductor. In one example, conducting ground plane 1002 and interstitial conductor 1003 are parallel to each other. In one example, the distance between ground plane 1002 and interstitial conductor 1003 is 0.1-0.15". In another example, this distance may be $\lambda/2$, where $\lambda$ is the wavelength of the travelling wave at the frequency of operation.

Ground plane 1002 is separated from interstitial conductor 1003 via a spacer 1004. In one example, spacer 1004 is a foam or air-like spacer. In one example, spacer 1004 comprises a plastic spacer.

On top of interstitial conductor 1003 is dielectric layer 1005. In one example, dielectric layer 1005 is plastic. The purpose of dielectric layer 1005 is to slow the travelling wave relative to free space velocity. In one example, dielectric layer 1005 slows the travelling wave by 30% relative to free space. In one example, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1005, such as periodic sub-wavelength metallic structures that can be machined or lithographically defined, for example.

An RF-array 1006 is on top of dielectric 1005. In one example, the distance between interstitial conductor 1003 and RF-array 1006 is 0.1-0.15". In another example, this distance may be $\lambda_{eff}/2$, where $\lambda_{eff}$ is the effective wavelength in the medium at the design frequency.

The antenna includes sides 1007 and 1008. Sides 1007 and 1008 are angled to cause a travelling wave feed from coax pin 1001 to be propagated from the area below interstitial conductor 1003 (the spacer layer) to the area above interstitial conductor 1003 (the dielectric layer) via reflection. In one example, the angle of sides 1007 and 1008 are at 45° angles. In an alternative example, sides 1007 and 1008 could be replaced with a continuous radius to achieve the reflection. While FIG. 10A shows angled sides that have angle of 45 degrees, other angles that accomplish signal transmission from lower level feed to upper level feed may be used. That is, given that the effective wavelength in the lower feed will generally be different than in the upper feed, some deviation from the ideal 45° angles could be used to aid transmission from the lower to the upper feed level.

In operation, when a feed wave is fed in from coaxial pin 1001, the wave travels outward concentrically oriented from coaxial pin 1001 in the area between ground plane 1002 and interstitial conductor 1003. The concentrically outgoing waves are reflected by sides 1007 and 1008 and travel inwardly in the area between interstitial conductor 1003 and RF array 1006. The reflection from the edge of the circular perimeter causes the wave to remain in phase (i.e., it is an in-phase reflection). The travelling wave is slowed by dielectric layer 1005. At this point, the travelling wave starts interacting and exciting with elements in RF array 1006 to obtain the desired scattering.

To terminate the travelling wave, a termination 1009 is included in the antenna at the geometric center of the antenna. In one example, termination 1009 comprises a pin termination (e.g., a 50Ω pin). In another example, termination 1009 comprises an RF absorber that terminates unused energy to prevent reflections of that unused energy back through the feed structure of the antenna. These could be used at the top of RF array 1006.

Figure 10B:
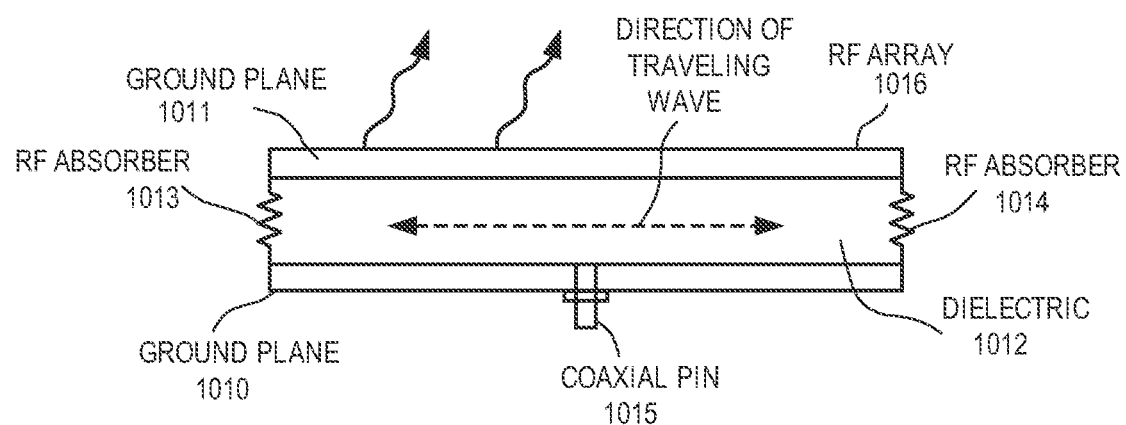
FIG. 10B illustrates another example of the antenna system with a cylindrical feed producing an outgoing wave.

FIG. 10B illustrates another example of the antenna system with an outgoing wave. Referring to FIG. 10B, two ground planes 1010 and 1011 are substantially parallel to each other with a dielectric layer 1012 (e.g., a plastic layer, etc.) in between ground planes 1010 and 1011. RF absorbers 1013 and 1014 (e.g., resistors) couple the two ground planes 1010 and 1011 together. A coaxial pin 1015 (e.g., 50Ω) feeds the antenna. An RF array 1016 is on top of dielectric layer 1012.

In operation, a feed wave is fed through coaxial pin 1015 and travels concentrically outward and interacts with the elements of RF array 1016.

The cylindrical feed in both the antennas of FIGS. 10A and 10B improves the service angle of the antenna. Instead of a service angle of plus or minus forty-five degrees azimuth (±45° Az) and plus or minus twenty-five degrees elevation (±25° El), in one example, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Examples of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1006 of FIG. 10A and RF array 1016 of FIG. 10B include a wave scattering subsystem that includes a group of patch antennas (i.e., scatterers) that act as radiators. This group of patch antennas comprises an array of scattering metamaterial elements.

In one example, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor.

In one example, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another example, the thickness of the liquid crystal results in a beam switching speed of approximately fourteen milliseconds (14 ms). In one example, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one example, the cylindrical feed geometry of this antenna system allows the CELC elements to be positioned at forty-five degree (45°) angles to the vector of the wave in the wave feed. This position of the elements enables control of the polarization of the free space wave generated from or received by the elements. In one example, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one example, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

Figure 21:
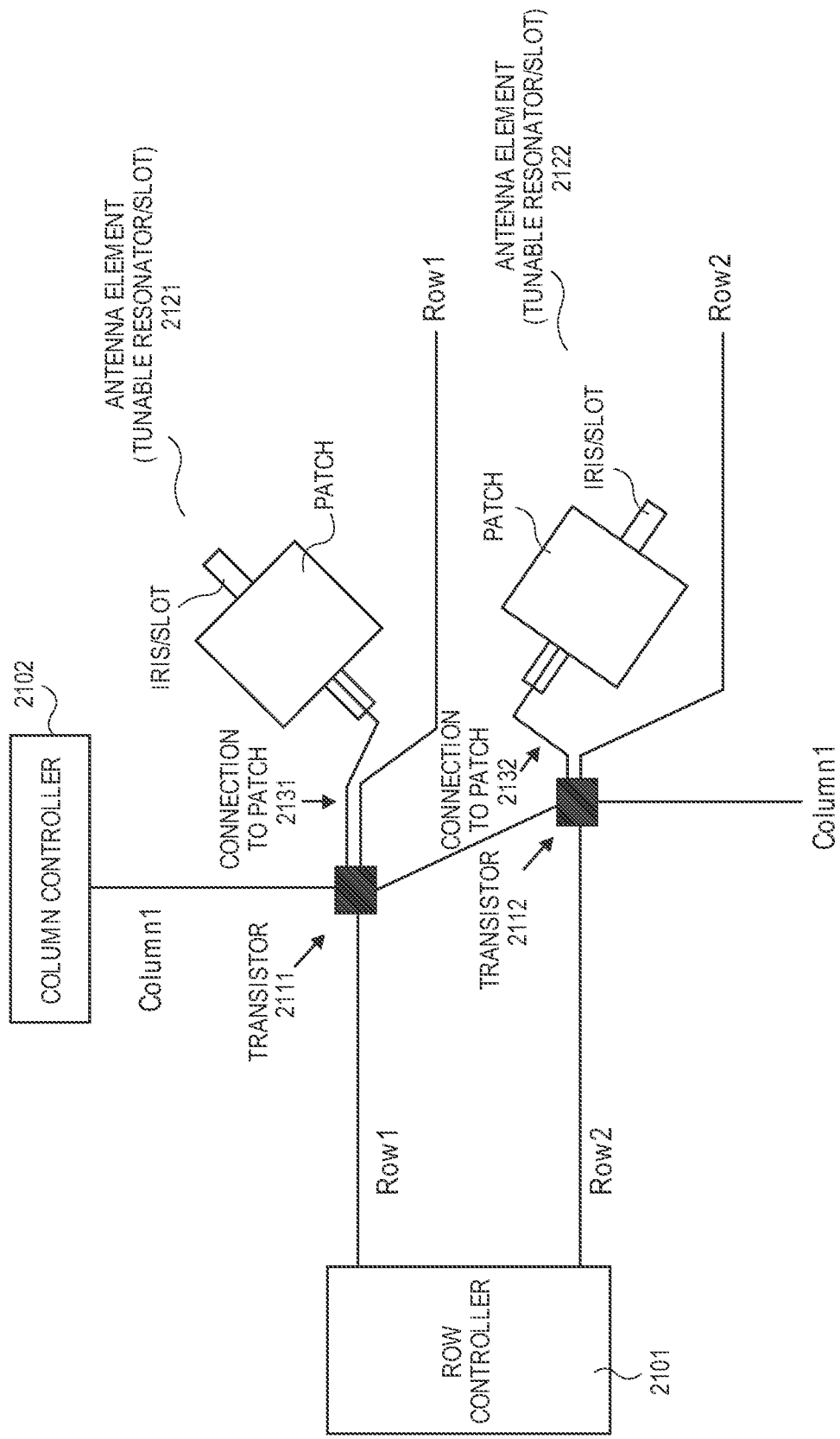
FIG. 21 illustrates one example of the placement of matrix drive circuitry with respect to antenna elements.

In one example, the antenna elements are placed on the cylindrical feed antenna aperture in a way that allows for a systematic matrix drive circuit. The placement of the cells includes placement of the transistors for the matrix drive. FIG. 21 illustrates one example of the placement of matrix drive circuitry with respect to antenna elements. Referring to FIG. 21, row controller 2101 is coupled to transistors 2111 and 2112, via row select signals Row1 and Row2, respectively, and column controller 2102 is coupled to transistors 2111 and 2112 via column select signal Column1. Transistor 2111 is also coupled to antenna element 2121 via connection to patch 2131, while transistor 2112 is coupled to antenna element 2122 via connection to patch 2132.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercial available layout tools.

In one example, the matrix drive circuitry is predefined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 11:
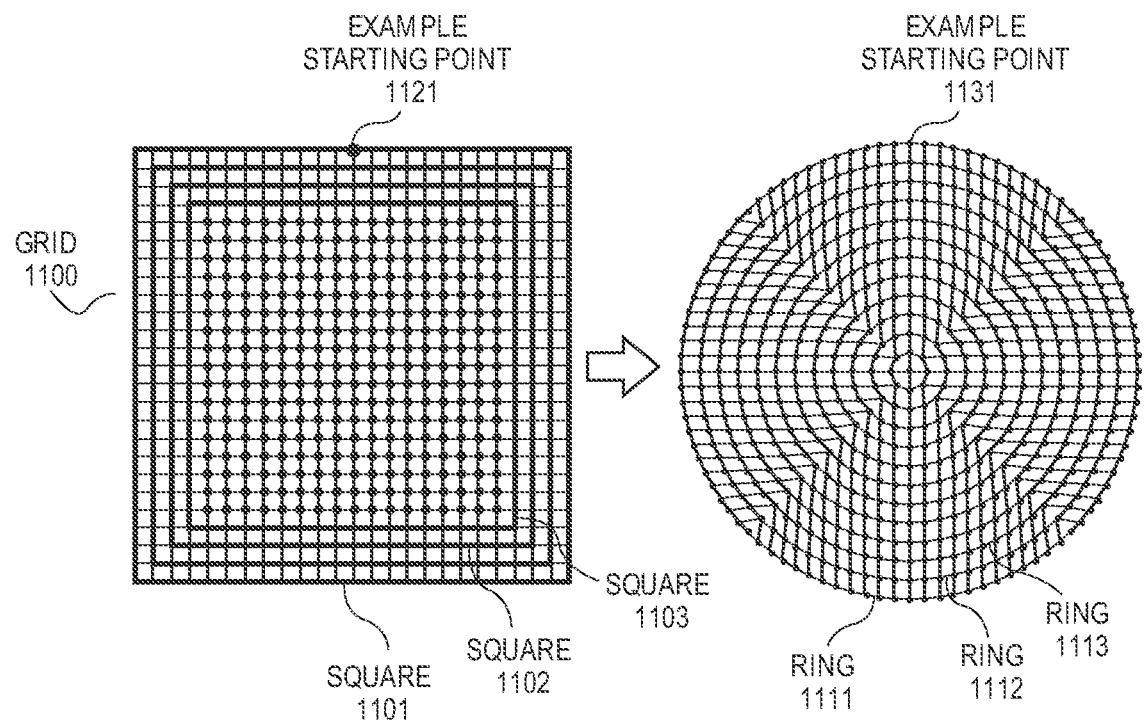
FIG. 11 shows an example where cells are grouped to form concentric squares (rectangles).

FIG. 11 shows an example where cells are grouped to form concentric squares (rectangles). Referring to FIG. 11, squares 1101-1103 are shown on the grid 1100 of rows and columns. In these examples, the squares and not all of the squares create the cell placement on the right side of FIG. 7. Each of the squares, such as squares 1101-1103, are then, through a mathematical conformal mapping process, transformed into rings, such as rings 1111-1113 of antenna elements. For example, the outer ring 1111 is the transformation of the outer square 1101 on the left.

The density of the cells after the transformation is determined by the number of cells that the next larger square contains in addition to the previous square. In one example, using squares results in the number of additional antenna elements, ΔN, to be 8 additional cells on the next larger square. In one example, this number is constant for the entire aperture. In one example, the ratio of cellpitch1 (CP1: ring to ring distance) to cellpitch2 (CP2: distance cell to cell along a ring) is given by:

$$CP1\,CP2 = \frac{\Delta N}{2\pi}$$

Thus, CP2 is a function of CP1 (and vice versa). The cell pitch ratio for the example in FIG. 7 is then $$\frac{CP1}{CP2} = \frac{8}{2\pi} = 1.2732$$

which means that the CP1 is larger than CP2.

In one example, to perform the transformation, a starting point on each square, such as starting point 1121 on square 1101, is selected and the antenna element associated with that starting point is placed on one position of its corresponding ring, such as starting point 1131 on ring 1111. For example, the x-axis or y-axis may be used as the starting point. Thereafter, the next element on the square proceeding in one direction (clockwise or counterclockwise) from the starting point is selected and that element placed on the next location on the ring going in the same direction (clockwise or counterclockwise) that was used in the square. This process is repeated until the locations of all the antenna elements have been assigned positions on the ring. This entire square to ring transformation process is repeated for all squares.

Figure 12:
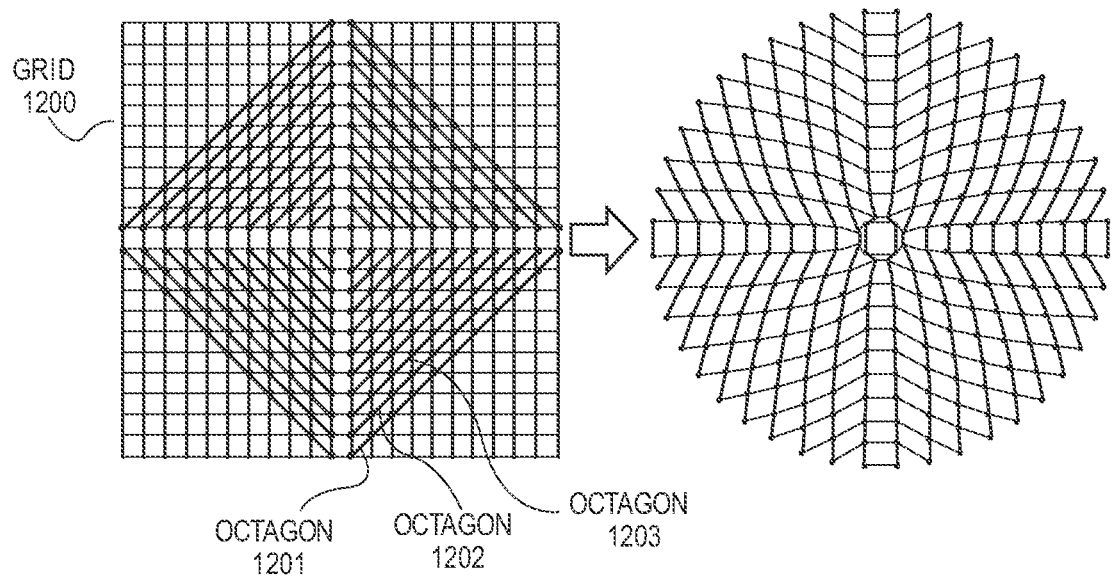
FIG. 12 shows an example where cells are grouped to form concentric octagons.

However, according to analytical studies and routing constraints, it is preferred to apply a CP2 larger than CP1. To accomplish this, a second strategy shown in FIG. 12 is used. Referring to FIG. 12, the cells are grouped initially into octagons, such as octagons 1201-1203, with respect to a grid 1200. By grouping the cells into octagons, the number of additional antenna elements ΔN equals 4, which gives a ratio:

$$CP1CP2 = \frac{4}{2\pi} = 0.6366$$

which results in CP2>CP1.

The transformation from octagon to concentric rings for cell placement according to FIG. 12 can be performed in the same manner as that described above with respect to FIG. 11 by initially selecting a starting point.

In one example, the cell placements disclosed with respect to FIGS. 11 and 12 have a number of features. These features include:
1) A constant CP1/CP2 over the entire aperture (Note that in one example an antenna that is substantially constant (e.g., being 90% constant) over the aperture will still function);
2) CP2 is a function of CP1;
3) There is a constant increase per ring in the number of antenna elements as the ring distance from the centrally located antenna feed increases;
4) All the cells are connected to rows and columns of the matrix;
5) All the cells have unique addresses;
6) The cells are placed on concentric rings; and There is rotational symmetry in that the four quadrants are identical and a ¼ wedge can be rotated to build out the array. This is beneficial for segmentation.

In other examples, while two shapes are given, any shapes may be used. Other increments are also possible (e.g., 6 increments).

Figure 13:
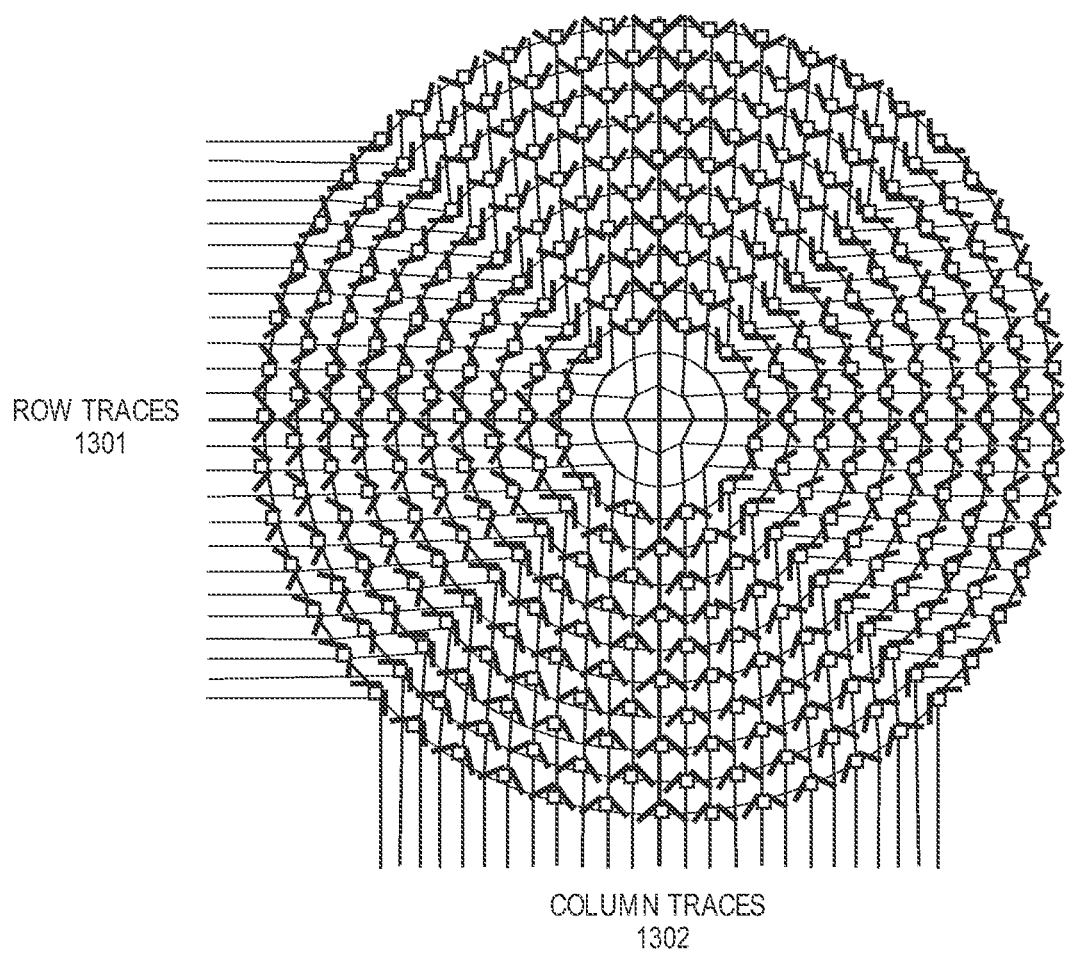
FIG. 13 shows an example of a small aperture including the irises and the matrix drive circuitry.

FIG. 13 shows an example of a small aperture including the irises and the matrix drive circuitry. The row traces 1301 and column traces 1302 represent row connections and column connections, respectively. These lines describe the matrix drive network and not the physical traces (as physical traces may have to be routed around antenna elements, or parts thereof). The square next to each pair of irises is a transistor.

FIG. 13 also shows the potential of the cell placement technique for using dual-transistors where each component drives two cells in a PCB array. In this case, one discrete device package contains two transistors, and each transistor drives one cell.

Figure 22:
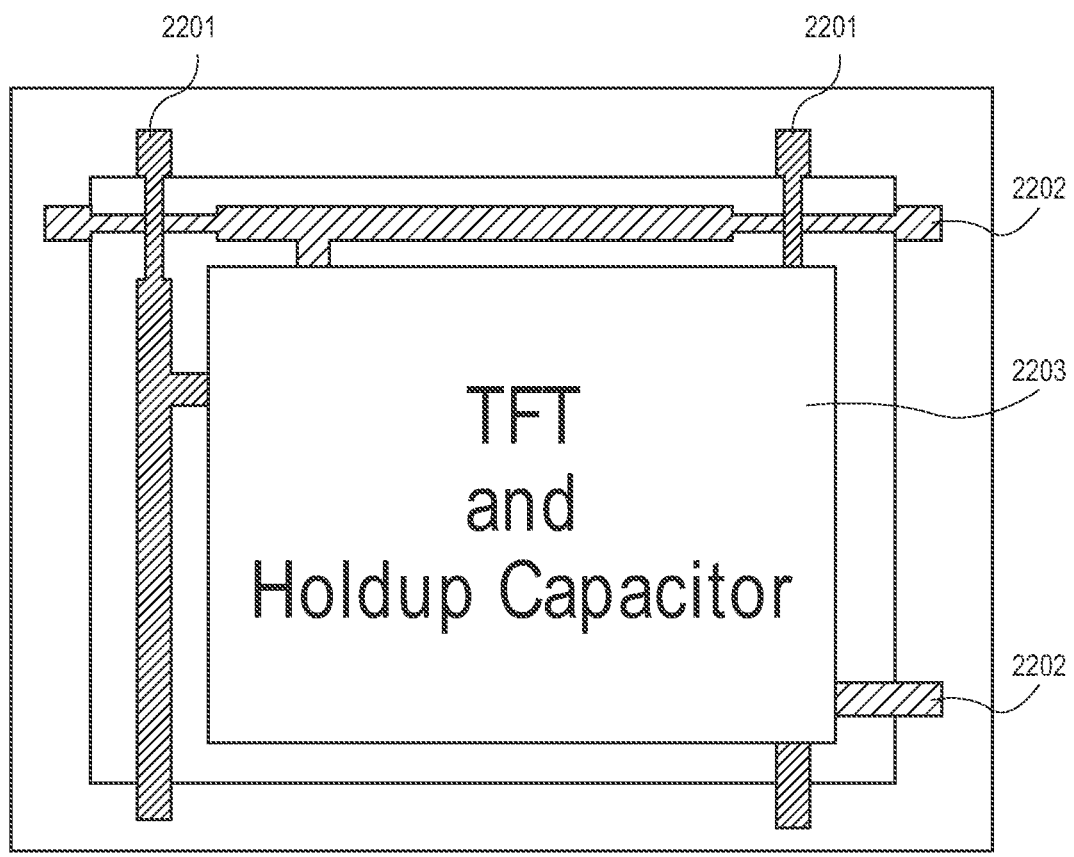
FIG. 22 illustrates one example of a TFT package.

In one example, a TFT package is used to enable placement and unique addressing in the matrix drive. FIG. 22 illustrates one example of a TFT package. Referring to FIG. 22, a TFT and a hold capacitor 2203 is shown with input and output ports. There are two input ports connected to traces 2201 and two output ports connected to traces 2202 to connect the TFTs together using the rows and columns. In one example, the row and column traces cross in 90° angles to reduce, and potentially minimize, the coupling between the row and column traces. In one example, the row and column traces are on different layers.

Another feature of the proposed cell placement shown in FIGS. 11-13 is that the layout is a repeating pattern in which each quarter of the layout is the same as the others. This allows the sub-section of the array to be repeated rotation-wise around the location of the central antenna feed, which in turn allows a segmentation of the aperture into sub-apertures. This helps in fabricating the antenna aperture.

In another example, the matrix drive circuitry and cell placement on the cylindrical feed antenna is accomplished in a different manner. To realize matrix drive circuitry on the cylindrical feed antenna, a layout is realized by repeating a subsection of the array rotation-wise. This example also allows the cell density that can be used for illumination tapering to be varied to improve the RF performance.

Figure 14:
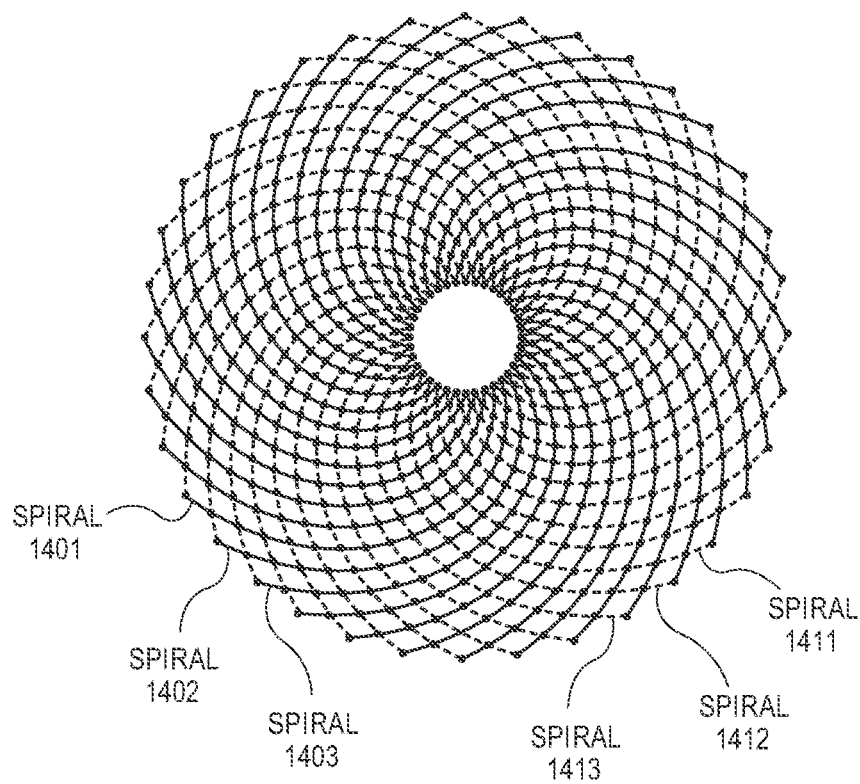
FIG. 14 shows an example of lattice spirals used for cell placement.

In this alternative approach, the placement of cells and transistors on a cylindrical feed antenna aperture is based on a lattice formed by spiral shaped traces. FIG. 14 shows an example of such lattice clockwise spirals, such as spirals 1401-1403, which bend in a clockwise direction and the spirals, such as spirals 1411-1413, which bend in a clockwise, or opposite, direction. The different orientation of the spirals results in intersections between the clockwise and counterclockwise spirals. The resulting lattice provides a unique address given by the intersection of a counterclockwise trace and a clockwise trace and can therefore be used as a matrix drive lattice. Furthermore, the intersections can be grouped on concentric rings, which is crucial for the RF performance of the cylindrical feed antenna.

Unlike the approaches for cell placement on the cylindrical feed antenna aperture discussed above, the approach discussed above in relation to FIG. 14 provides a non-uniform distribution of the cells. As shown in FIG. 14, the distance between the cells increases with the increase in radius of the concentric rings. In one example, the varying density is used as a method to incorporate an illumination tapering under control of the controller for the antenna array.

Figure 15:
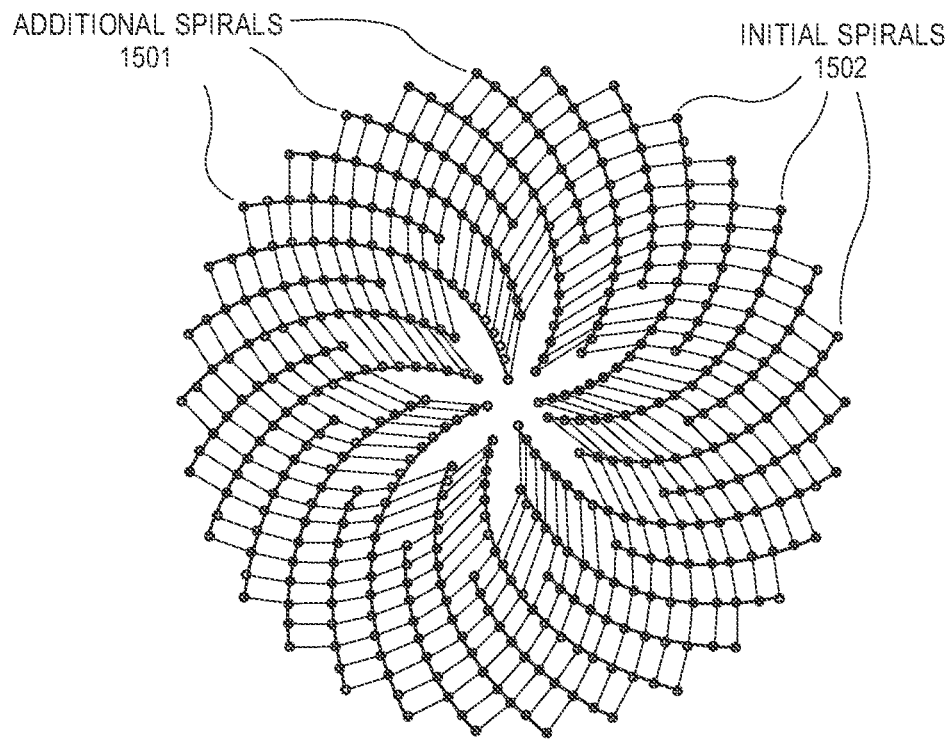
FIG. 15 shows an example of cell placement that uses additional spirals to achieve a more uniform density.

Due to the size of the cells and the required space between them for traces, the cell density cannot exceed a certain number. In one example, the distance is ⅕ based on the frequency of operation. As described above, other distances may be used. In order to avoid an overpopulated density close to the center, or in other words to avoid an underpopulation close to the edge, additional spirals can be added to the initial spirals as the radius of the successive concentric rings increases. FIG. 15 shows an example of cell placement that uses additional spirals to achieve a more uniform density. Referring to FIG. 15, additional spirals, such as additional spirals 1501, are added to the initial spirals, such as spirals 1502, as the radius of the successive concentric rings increases. According to analytical simulations, this approach provides an RF performance that converges the performance of an entirely uniform distribution of cells. In one example, this design provides a better side lobe behavior because of the tapered element density than some examples described above.

Figure 16:
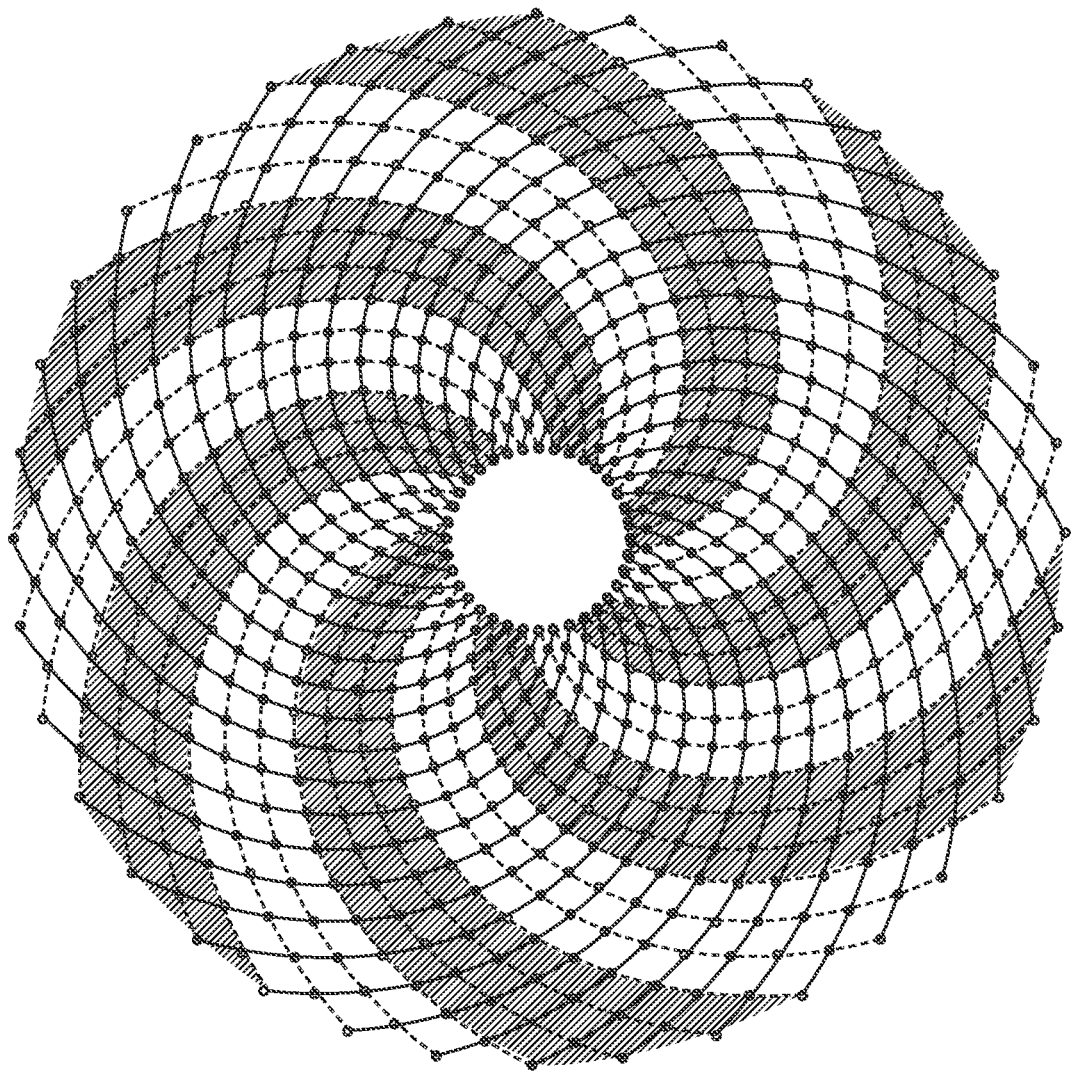
FIG. 16 illustrates a selected pattern of spirals that is repeated to fill the entire aperture according to one example.

Another advantage of the use of spirals for cell placement is the rotational symmetry and the repeatable pattern which can simplify the routing efforts and reducing fabrication costs. FIG. 16 illustrates a selected pattern of spirals that is repeated to fill the entire aperture.

In one example, the cell placements disclosed with respect to FIGS. 14-16 have a number of features. These features include:
1) CP1/CP2 is not over the entire aperture;
2) CP2 is a function of CP1;
3) There is no increase per ring in the number of antenna elements as the ring distance from the centrally located antenna feed increases;
4) All the cells are connected to rows and columns of the matrix;
5) All the cells have unique addresses;
6) The cells are placed on concentric rings; and
7) There is rotational symmetry (as described above).

Thus, the cell placement examples described above in conjunction with FIGS. 14-16 have many similar features to the cell placement examples described above in conjunction with FIGS. 11-13.

Aperture Segmentation

In one example, the antenna aperture is created by combining multiple segments of antenna elements together. This requires that the array of antenna elements be segmented and the segmentation ideally requires a repeatable footprint pattern of the antenna. In one example, the segmentation of a cylindrical feed antenna array occurs such that the antenna footprint does not provide a repeatable pattern in a straight and inline fashion due to the different rotation angles of each radiating element. One goal of the segmentation approach disclosed herein is to provide segmentation without compromising the radiation performance of the antenna.

While segmentation techniques described herein focuses improving, and potentially maximizing, the surface utilization of industry standard substrates with rectangular shapes, the segmentation approach is not limited to such substrate shapes.

In one example, segmentation of a cylindrical feed antenna is performed in a way that the combination of four segments realize a pattern in which the antenna elements are placed on concentric and closed rings. This aspect is important to maintain the RF performance. Furthermore, in one example, each segment requires a separate matrix drive circuitry.

Figure 17:
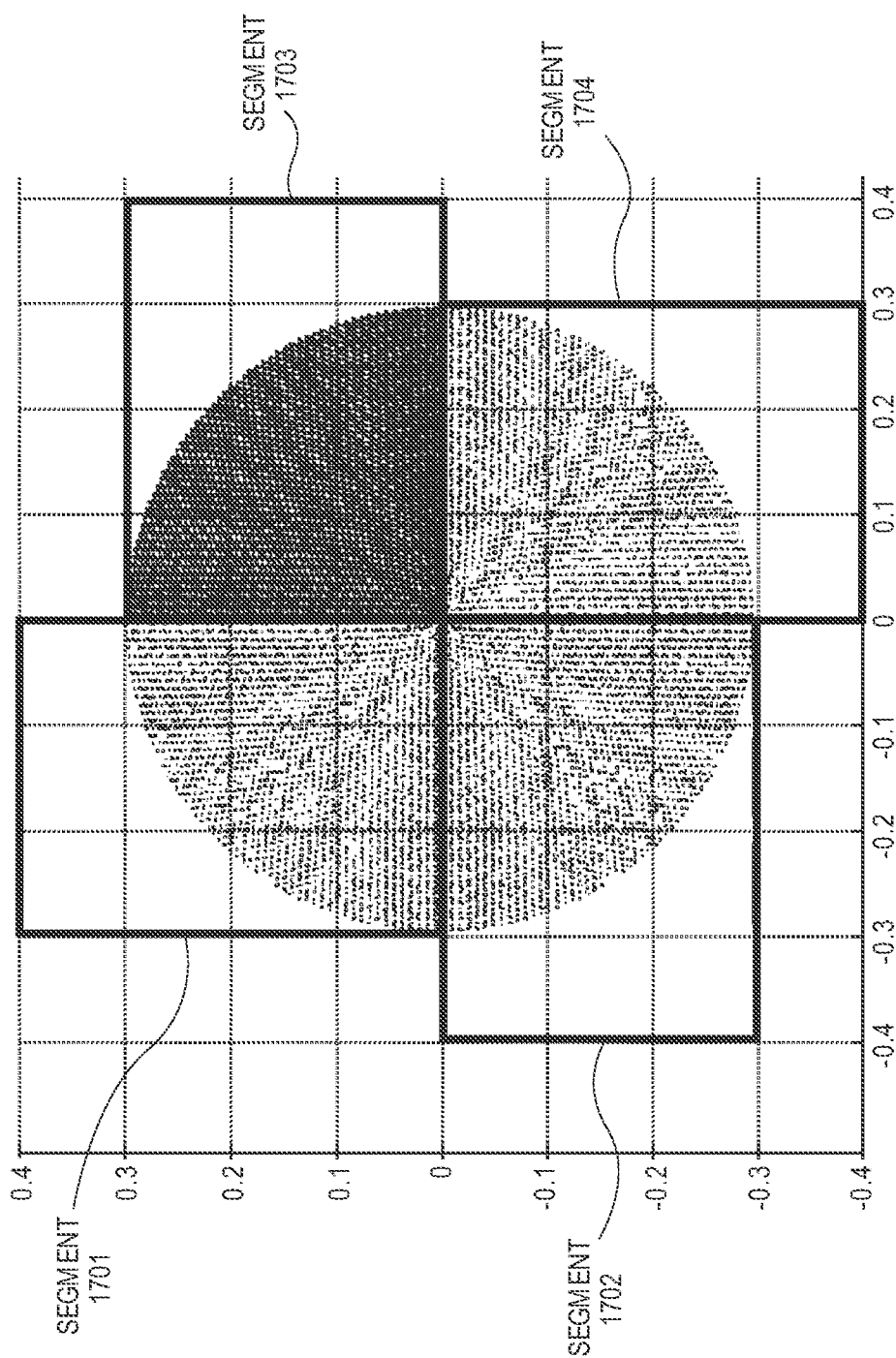
FIG. 17 illustrates one embodiment of segmentation of a cylindrical feed aperture into quadrants according to one example.

FIG. 17 illustrates segmentation of a cylindrical feed aperture into quadrants. Referring to FIG. 17, segments 1701-1704 are identical quadrants that are combined to build a round antenna aperture. The antenna elements on each of segments 1701-1704 are placed in portions of rings that form concentric and closed rings when segments 1701-1704 are combined. To combine the segments, segments are mounted or laminated to a carrier. In another example, overlapping edges of the segments are used to combine them together. In this case, in one example, a conductive bond is created across the edges to prevent RF from leaking. Note that the element type is not affected by the segmentation.

As the result of this segmentation method illustrated in FIG. 17, the seams between segments 1701-1704 meet at the center and go radially from the center to the edge of the antenna aperture. This configuration is advantageous since the generated currents of the cylindrical feed propagate radially and a radial seam has a low parasitic impact on the propagated wave.

Figure 18B:
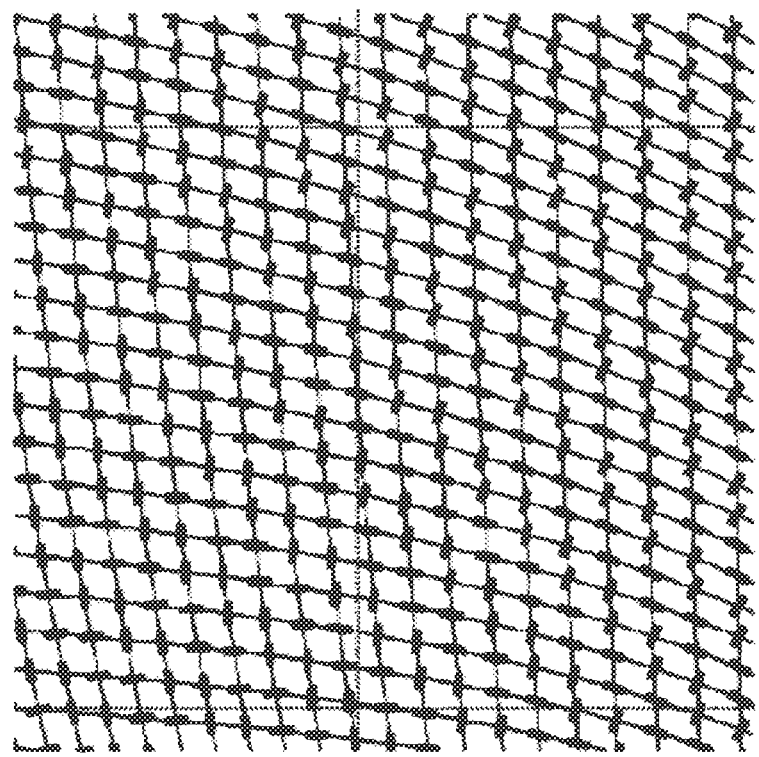
FIGS. 18A and 18B illustrate a single segment of FIG. 17 with the applied matrix drive lattice according to one example.
Figure 18A:
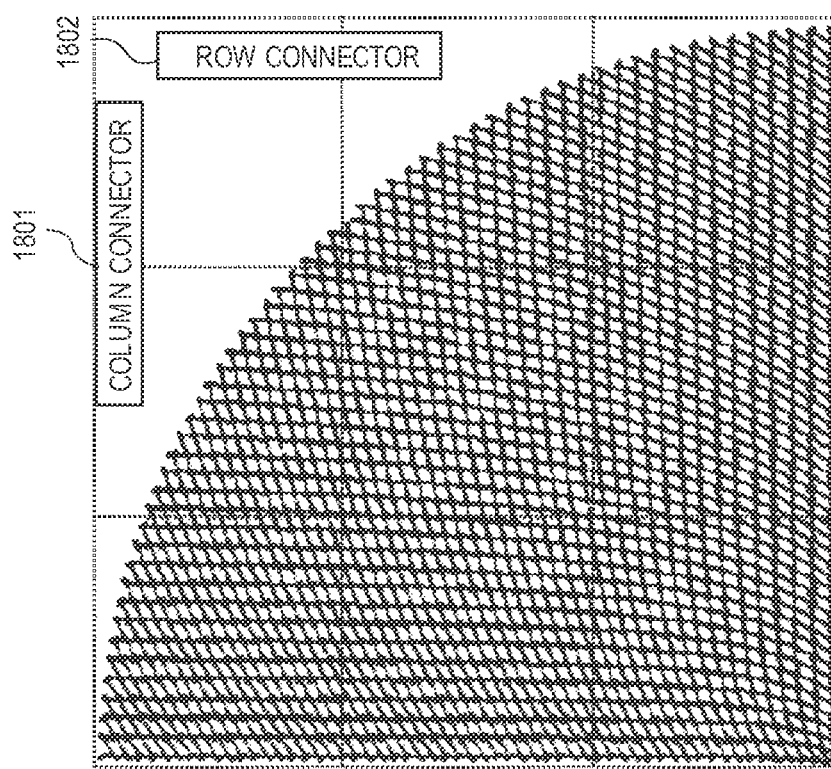

As shown in FIG. 17, rectangular substrates, which are a standard in the LCD industry, can also be used to realize an aperture. FIGS. 18A and 18B illustrate a single segment of FIG. 17 with the applied matrix drive lattice. The matrix drive lattice assigns a unique address to each of transistor. Referring to FIGS. 18A and 18B, a column connector 1801 and row connector 1802 are coupled to drive lattice lines. FIG. 18B also shows irises coupled to lattice lines.

Figure 19:
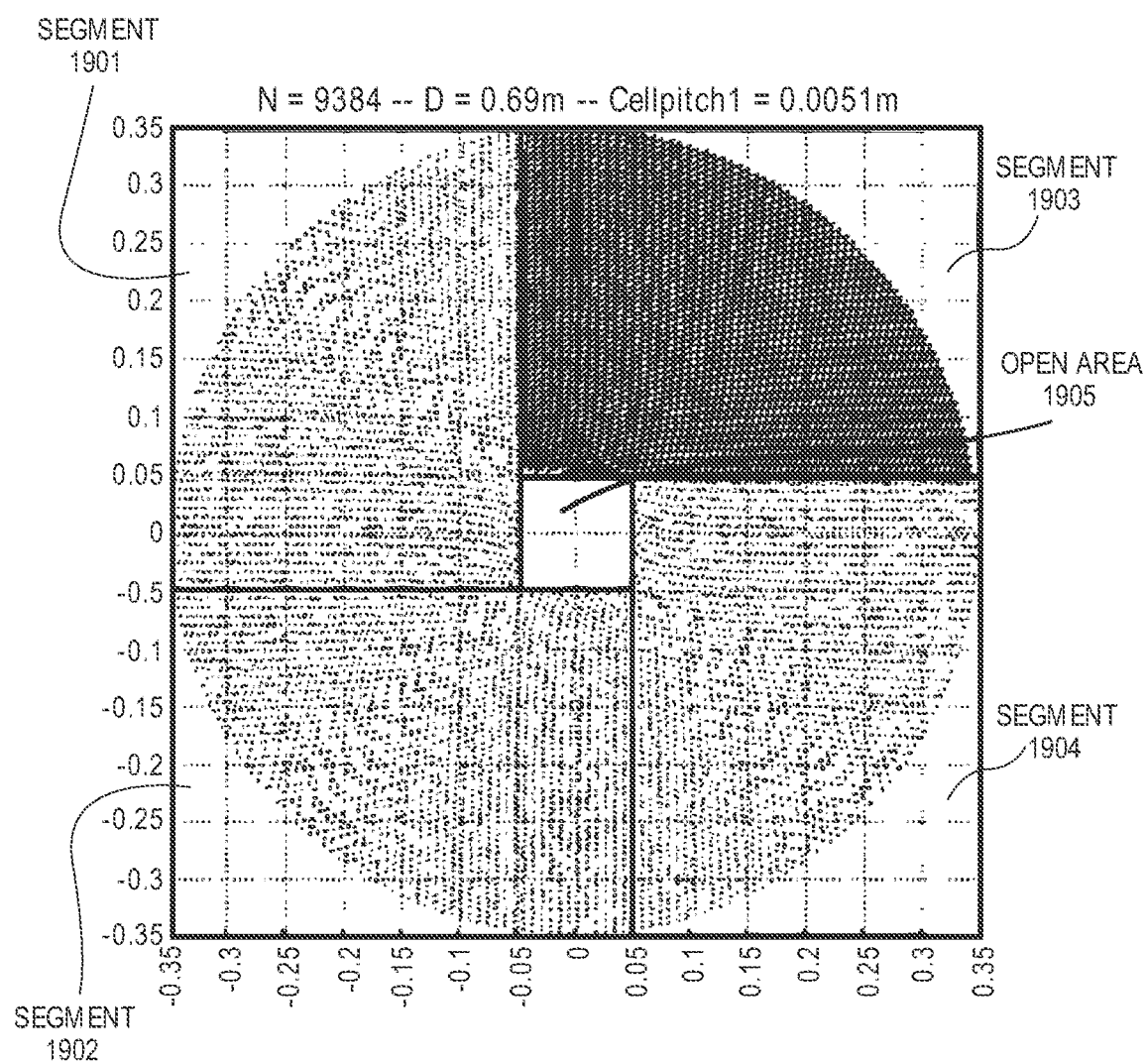
FIG. 19 illustrates another example of segmentation of a cylindrical feed aperture into quadrants.

As is evident from FIG. 17, a large area of the substrate surface cannot be populated if a non-square substrate is used. In order to have a more efficient usage of the available surface on a non-square substrate, in another example, the segments are on rectangular boards but utilize more of the board space for the segmented portion of the antenna array. One example of such an example is shown in FIG. 19. Referring to FIG. 19, the antenna aperture is created by combining segments 1901-1904, which comprises substrates (e.g., boards) with a portion of the antenna array included therein. While each segment does not represent a circle quadrant, the combination of four segments 1901-1904 closes the rings on which the elements are placed. That is, the antenna elements on each of segments 1901-1904 are placed in portions of rings that form concentric and closed rings when segments 1901-1904 are combined. In one example, the substrates are combined in a sliding tile fashion, so that the longer side of the non-square board introduces a rectangular open area 1905. Open area 1905 is where the centrally located antenna feed is located and included in the antenna.

The antenna feed is coupled to the rest of the segments when the open area exists because the feed comes from the bottom, and the open area can be closed by a piece of metal to prevent radiation from the open area. A termination pin may also be used.

The use of substrates in this fashion allows use of the available surface area more efficiently and results in an increased aperture diameter.

Figure 20B:
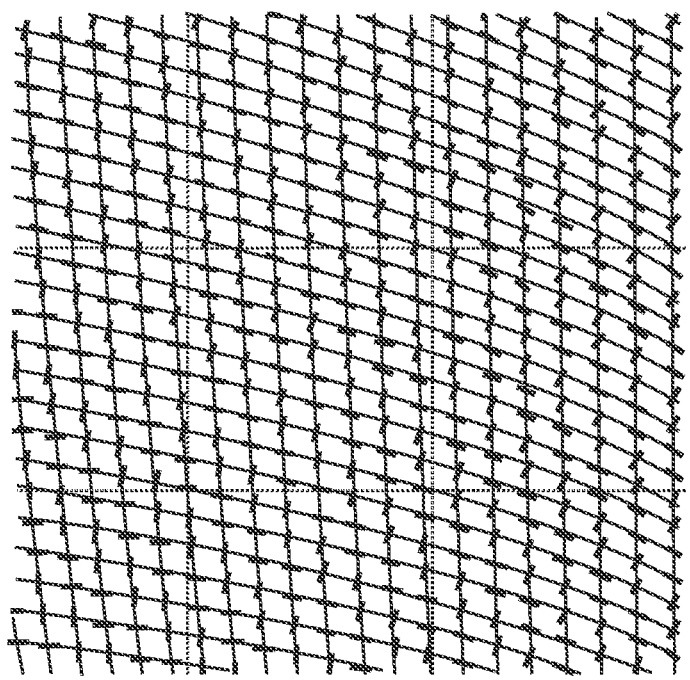
FIGS. 20A and 20B illustrate a single segment of FIG. 19 with the applied matrix drive lattice.
Figure 20A:
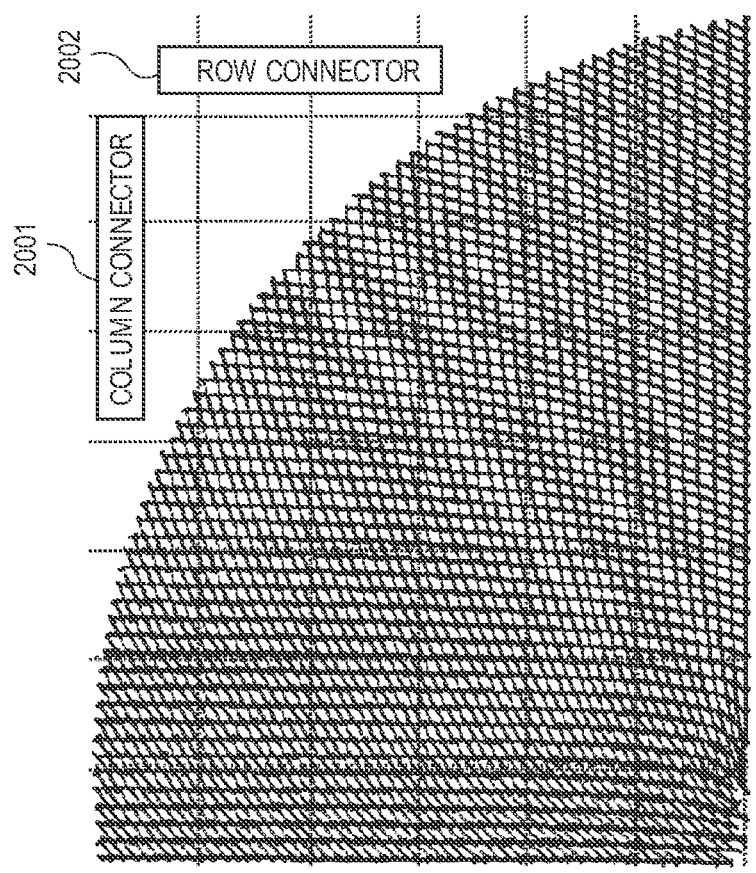

Similar to the example shown in FIGS. 17, 18A and 18B, this example allows use of a cell placement strategy to obtain a matrix drive lattice to cover each cell with a unique address. FIGS. 20A and 20B illustrate a single segment of FIG. 19 with the applied matrix drive lattice. The matrix drive lattice assigns a unique address to each of transistor. Referring to FIGS. 20A and 20B, a column connector 2001 and row connector 2002 are coupled to drive lattice lines. FIG. 20B also shows irises.

For both approaches described above, the cell placement may be performed based on a recently disclosed approach which allows the generation of matrix drive circuitry in a systematic and predefined lattice, as described above.

While the segmentations of the antenna arrays above are into four segments, this is not a requirement. The arrays may be divided into an odd number of segments, such as, for example, three segments or five segments. FIGS. 23A and 23B illustrate one example of an antenna aperture with an odd number of segments. Referring to FIG. 23A, there are three segments, segments 2301-2303, that are not combined. Referring to FIG. 23B, the three segments, segments 2301-2303, when combined, form the antenna aperture. These arrangements are not advantageous because the seams of all the segments do not go all the way through the aperture in a straight line. However, they do mitigate side lobes.

Whereas many alterations and modifications of the present invention will no doubt become apparent to a person of ordinary skill in the art after having read the foregoing description, it is to be understood that any particular example shown and described by way of illustration is in no way intended to be considered limiting. Therefore, references to details of various examples are not intended to limit the scope of the claims which in themselves recite only those features regarded as essential to the invention.

What is claimed is:

1. An antenna comprising:
 a single physical antenna aperture having at least two spatially interleaved antenna sub-arrays of antenna elements operable as two resonator sets with a frequency offset with respect to each other, wherein the antenna sub-arrays are operated together with the frequency offset to form a single beam in a desired frequency band that is wider than each bandwidth achievable individually with each sub-array.

2. The antenna of claim 1, wherein the antenna elements of each sub-array include radiative elements and the frequency offset is achieved by geometrical differences or differences in electromagnetic loading of the radiative elements of each sub-array.

3. The antenna of claim 1, wherein each sub-array has a modulation pattern calculated based on holographic beam steering algorithms.

4. The antenna of claim 2, wherein each sub-array is controlled via a different modulation pattern.

5. The antenna of claim 1, wherein the at least two antenna arrays comprise combined interleaved dual receive antenna arrays operable to perform reception in at least one receive band.

6. The antenna of claim 1, wherein each of the at least two antenna sub-arrays is to operate based on beam forming algorithms.

7. The antenna of claim 6, wherein the beam forming algorithms include holographic beam forming algorithms.

8. The antenna of claim 1, wherein each of the at least two antenna sub-arrays comprise a tunable slotted array of antenna elements combined into the single physical aperture.

9. The antenna of claim 8, wherein antenna elements in each of the tunable slots of the at least two antenna sub-arrays are interleaved and spaced with respect to each other.

10. The antenna of claim 8, wherein antenna elements in each of the tunable slotted arrays are positioned in one or more rings.

11. The antenna of claim 10, wherein at least one ring includes antenna elements of both tunable slotted arrays.

12. The antenna of claim 11, wherein the antenna elements of both tunable slotted arrays are alternating or randomly distributed.

13. The antenna of claim 8, wherein each slotted array comprises a plurality of slots and further wherein each slot is tuned to provide a desired scattering at a given frequency.

14. The antenna of claim 13, wherein each slot of the plurality of slots is oriented either +45 degrees or −45 degrees relative to a cylindrical feed wave impinging at a central location of each said slot, such that the slotted array includes a first set of slots rotated +45 degrees relative to the cylindrical feed wave propagation direction and a second set of slots rotated −45 degrees relative to the propagation direction of the cylindrical feed wave.

15. The antenna of claim 8, wherein each slotted array comprises:
a plurality of slots;
a plurality of patches, wherein each of the patches is co-located over and separated from a slot in the plurality of slots, forming a patch/slot pair, each patch/slot pair being turned off or on based on application of a voltage to the patch in the pair; and
a controller that applies a control pattern that controls which patch/slot pairs are on and off, thereby causing generation of a beam.

16. A method of making a flat panel antenna comprising:
forming a first set of resonators on an aperture of the flat panel antenna, the first set of resonators operating at a first frequency range; and
forming a second set of resonators on the aperture of the flat panel antenna, the second set of resonators operating at a second frequency range, wherein the first set of resonators and second set of resonators are operated together to form a single beam in a desired frequency band that is wider than bandwidth achievable individually with each of the first and second set of resonators, wherein the first frequency range and second frequency range have a frequency offset.

17. The method of claim 16, wherein the first set of resonators and second set of resonators are formed to have different geometries or electromagnetically loaded differently.

18. The method of claim 16, wherein the first frequency range and second frequency range overlap at the frequency offset.

19. The method of claim 16, wherein forming the first set of resonators include forming a first set of dipoles and forming the second set of resonators include forming a second set of dipoles, wherein the first set of dipoles and second set of dipoles of have different sizes and different placement on the aperture of the flat panel antenna.

20. The method of claim 19, wherein the first set of resonators and second set of resonators operate independently of each other.

* * * * *